US011619520B2

(12) United States Patent
Ausserlechner et al.

(10) Patent No.: US 11,619,520 B2
(45) Date of Patent: Apr. 4, 2023

(54) INDUCTIVE ANGLE AND/OR POSITION SENSOR

(71) Applicant: Infineon Technologies AG, Neubiberg (DE)

(72) Inventors: Udo Ausserlechner, Villach (AT); Horst Theuss, Wenzenbach (DE); Thomas Mueller, Lappersdorf (DE)

(73) Assignee: Infineon Technologies AG, Neubiberg (DE)

( * ) Notice: Subject to any disclaimer, the term of this patent is extended or adjusted under 35 U.S.C. 154(b) by 46 days.

(21) Appl. No.: 17/247,665

(22) Filed: Dec. 18, 2020

(65) Prior Publication Data
US 2021/0190543 A1 Jun. 24, 2021

(30) Foreign Application Priority Data

Dec. 20, 2019 (DE) .......................... 102019220492.9

(51) Int. Cl.
*G01D 5/20* (2006.01)
(52) U.S. Cl.
CPC .................................. *G01D 5/204* (2013.01)
(58) Field of Classification Search
CPC .......... G01D 5/00; G01D 5/20; G01D 5/204; G01D 5/2053; G01P 3/488; G01R 27/267; G01V 3/10; G01V 3/104; G01V 3/105; G01V 3/107; G01V 3/108; G01V 3/28; G01B 7/02; G01B 7/30
See application file for complete search history.

(56) References Cited

U.S. PATENT DOCUMENTS

| 6,043,644 | A  | 3/2000  | De Coulon        |
| 6,236,199 | B1 | 5/2001  | Irle et al.      |
| 10,371,498| B2 | 8/2019  | Moser            |
| 10,907,992| B2 | 2/2021  | Utermoehlen      |
| 11,137,267| B2 | 10/2021 | Utermoehlen      |
| 11,313,924| B2 | 4/2022  | David            |
| 2010/0156402 | A1 | 6/2010 | Straubinger et al. |
| 2013/0257417 | A1 | 10/2013 | Ely            |
| 2014/0132253 | A1 | 5/2014  | Bertin          |
| 2015/0219472 | A1 | 8/2015  | Ausserlechner et al. |

(Continued)

FOREIGN PATENT DOCUMENTS

| CH | 690934 A5 | 2/2001 |
| CN | 203719615 U | 7/2014 |

(Continued)

*Primary Examiner* — Son T Le
(74) *Attorney, Agent, or Firm* — Harrity & Harrity, LLP

(57) ABSTRACT

The present disclosure relates to an inductive angle and/or position sensor comprising a first sensor component and a second sensor component, which is movable relative thereto, wherein the first sensor component comprises an excitation coil and a receiving coil arrangement having two or more individual receiving coils, and wherein the second sensor component comprises an inductive target. The first sensor component comprises a semiconductor chip having an integrated circuit. The sensor comprises a housing, in which the semiconductor chip is arranged. The individual receiving coils of the receiving coil arrangement are configured in at least two structured metallization layers spaced apart from one another, which are arranged within the housing and/or outside on an outer surface of the housing.

19 Claims, 12 Drawing Sheets

(56) References Cited

U.S. PATENT DOCUMENTS

| | | | |
|---|---|---|---|
| 2015/0241248 A1 | 8/2015 | Tan | |
| 2016/0123194 A1 | 5/2016 | Kajiura et al. | |
| 2017/0263522 A1* | 9/2017 | Kim | H01L 24/09 |
| 2019/0063956 A1 | 2/2019 | Bertin | |
| 2019/0094047 A1 | 3/2019 | Utermoehlen | |
| 2019/0360839 A1* | 11/2019 | Shao | H03K 17/97 |
| 2020/0088549 A1* | 3/2020 | Shao | G01D 5/2066 |
| 2021/0364325 A1 | 11/2021 | Ausserlechner | |
| 2021/0373091 A1* | 12/2021 | Hiligsmann | G01R 33/0047 |

FOREIGN PATENT DOCUMENTS

| | | |
|---|---|---|
| CN | 104833305 A | 8/2015 |
| CN | 105378500 A | 3/2016 |
| CN | 107121057 A | 9/2017 |
| CN | 107401975 A | 11/2017 |
| CN | 108700432 A | 10/2018 |
| CN | 208780115 U | 4/2019 |
| DE | 10154710 A1 | 6/2002 |
| DE | 102015220615 A1 | 4/2017 |
| DE | 102016202867 B3 | 4/2017 |
| EP | 0909955 A2 | 4/1999 |
| EP | 0909955 B1 | 9/2009 |
| GB | 2488389 A | 8/2012 |
| JP | 2016070713 A | 5/2016 |
| JP | 2016114424 A | 6/2016 |
| JP | 2016114425 A | 6/2016 |

* cited by examiner

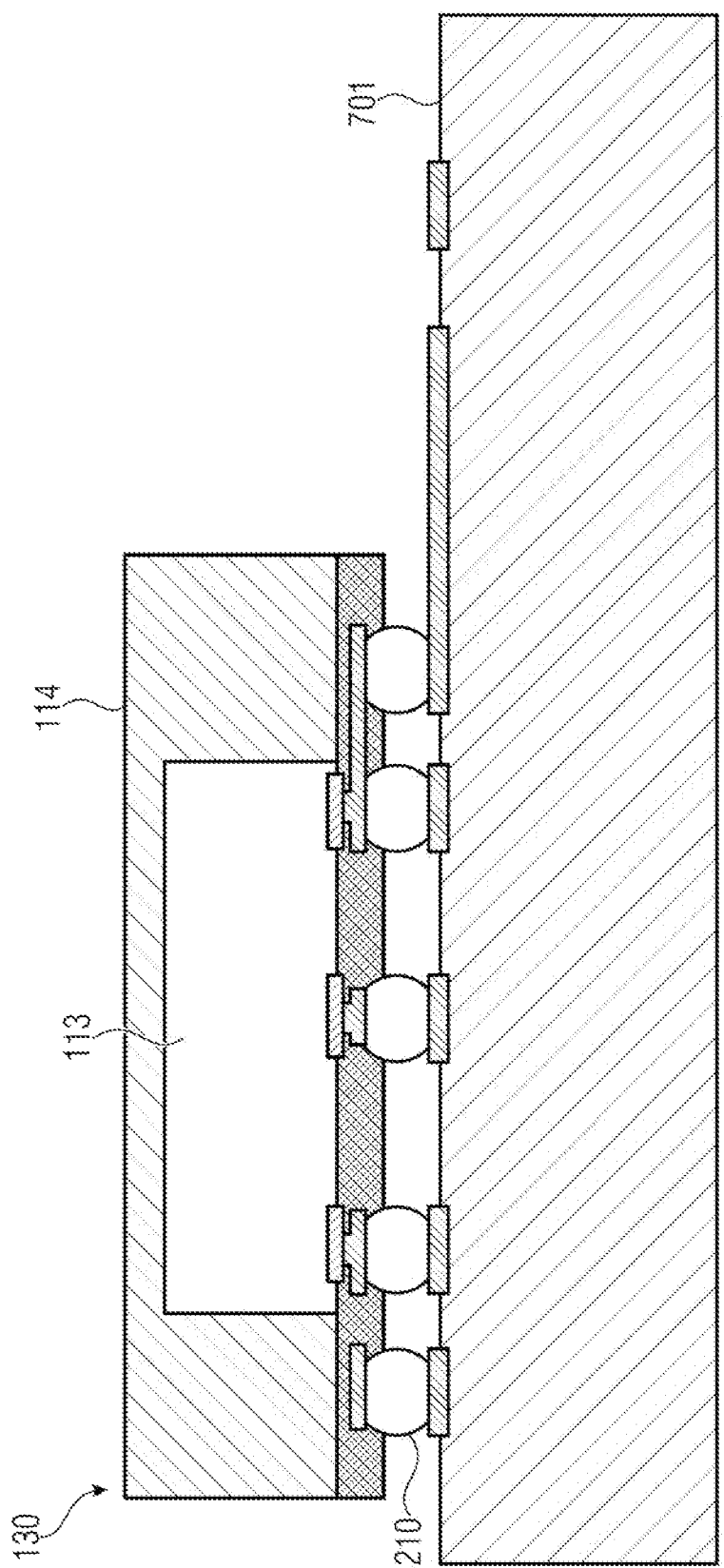

INDUCTIVE ANGLE AND/OR POSITION SENSOR

CROSS REFERENCE TO RELATED APPLICATION

This application claims priority to German Patent Application No. 102019220492.9 filed on Dec. 20, 2019, the content of which is incorporated by reference herein in its entirety.

TECHNICAL FIELD

The present concept relates to an inductive angle and/or position sensor. Some example implementations relate to an inductive angle and/or position sensor comprising an excitation coil, an inductive target and a receiving coil arrangement and also comprising a housing, wherein a semiconductor chip is arranged in the housing, and wherein the receiving coil arrangement is arranged within or outside on an outer surface of the housing.

BACKGROUND

Position sensors are used to determine a position between two moving components. The position can be measured in relative or absolute terms. In this case, the two components that are movable relative to one another can perform a linear movement, for example. By way of example, the determination of the position of a slide in a rail would be conceivable. Curved movement paths are also conceivable in the context of position determination.

Angle sensors, by contrast, are primarily used for rotational movements in order to determine the position between two components rotating with respect to one another, such as a rotor and a stator, for example. Such angle sensors are used for example for determining a steering angle or for determining the position of a motor shaft and the like.

A combination of translational and rotational movements between two moving components is also conceivable, wherein the absolute or relative position of the two components with respect to one another can be determined.

SUMMARY

There are various methods and devices for determining the position and/or the angle between two components. The concept described herein is concerned with sensors in the technical field of inductive angle and/or position measurement.

In this case, an excitation coil is arranged on a first sensor component, for example on a stator. The excitation coil is excited with an AC current and thereupon generates a corresponding induction or magnetic field. A second sensor component, for example a rotor, is translationally and/or rotationally movable relative to the first sensor component. A so-called inductive target is provided on the second sensor component. The inductive target receives the induction or magnetic field generated by the excitation coil. The inductive target is electrically conductive, such that an induced current forms in the inductive target in reaction to the received induction or magnetic field. The induced current in turn causes a corresponding induction or magnetic field in the target. The first sensor component, that is to say the stator, for example, comprises a receiving coil, which receives the induction or magnetic field generated by the target and generates in reaction thereto an induction signal, for example a corresponding induced current or an induced voltage. In this case, the signal strength of the induction signal is primarily dependent on the position of the two sensor components with respect to one another and thus varies depending on the position between the two sensor components. Consequently, the position of the two sensor components with respect to one another can be determined on the basis of an evaluation of the signal strength of the induction signal induced in the receiving coil.

This inductive sensor principle thus differs from conventional magnetic field sensors that measure the magnetic field strength of an, in particular permanent, magnetic field. In this case, the magnetic field strength varies depending on the position of the two sensor components with respect to one another. A further difference consists in the selection of the materials, for example. Whereas ferromagnetic materials are used in a magnetic field sensor, non-ferromagnetic materials having electrical conductivity, for example aluminum, can also be used in inductive sensors.

Magnetic field sensors can be produced with very small dimensions. However, magnetic field sensors are susceptible to external interference variables that can result in particular from the presence of ferromagnetic materials. Consequently, the reliability of magnetic field sensors can in some instances vary greatly in environments with many magnetic components.

By contrast, inductive angle and/or position sensors are insensitive vis-à-vis ferromagnetic materials. The field of use of inductive sensors is thus extended significantly compared with the field of use of magnetic field sensors described above. Moreover, inductive sensors are substantially insusceptible vis-à-vis external influences such as dust, dirt or liquids, for example.

Depending on the intended sensitivity of the inductive sensor or the size of the desired measurement distances of the inductive sensor, in part high currents are induced in the respective coils. In order to ensure a desired high sensitivity of an inductive sensor, the losses and parasitic inductances should be minimized in this case. Accordingly, the dimensions of the windings of the respective coils should be designed for the in part high currents. The coils are therefore normally produced in the form of structured conductor tracks on printed circuit boards, so-called PCBs. On the PCB, a chip package having a corresponding circuit for operating the inductive sensor on the PCB is additionally arranged laterally next to the structured conductor track coils. Inductive sensors should be as small as possible. However, both the conductor track coil structured on the PCB and the chip housing positioned next to it require a certain minimum mounting area. Moreover, the minimum conductor track thickness that can be realized on a PCB is also an additional limiting factor for the degree of miniaturization of the sensor.

Accordingly, implementations described herein may provide an inductive angle and/or position sensor which has the smallest possible dimensions and at the same time a high sensitivity vis-à-vis changes in the induction signal induced in the receiving coil arrangement.

The inductive angle and/or position sensor described herein can comprise, inter alia, a first sensor component and a second sensor component, which is movable relative thereto. The first sensor component can comprise an excitation coil and a receiving coil arrangement having two or more individual receiving coils, and the second sensor component can comprise an inductive target. The excitation coil can be able to be excited with an AC current in order to induce an induced current in the inductive target. The inductive target can be configured to generate a magnetic field in reaction to the induced current, the magnetic field in turn generating an induction signal in the receiving coil arrangement. The first sensor component can comprise a semiconductor chip having an integrated circuit configured to determine a position of the second sensor component relative to the first sensor component on the basis of the induction signal. The inductive angle and/or position sensor can furthermore comprise a housing, in which the semiconductor chip is arranged. The individual receiving coils of the receiving coil arrangement can be configured in at least two structured metallization layers spaced apart from one another. Alternatively or additionally, the excitation coil can be configured in at least one structured metallization layer. In this case, the respective metallization layers can be arranged within the housing or outside on an outer surface of the housing. The present concept can thus provide an integration of a semiconductor chip together with the receiving coils and/or the excitation coil in and/or on a common housing.

BRIEF DESCRIPTION OF THE DRAWINGS

Some example implementations are illustrated by way of example in the drawing and are explained below. In the figures:

FIG. 7A shows a schematic sectional view of a package with a receiving coil arrangement, wherein the package is arranged on a printed circuit board, in accordance with one conceivable example implementation.

DETAILED DESCRIPTION

Example implementations are described in greater detail below with reference to the figures, wherein elements having the same or a similar function are provided with the same reference signs.

Method steps which are illustrated in a block diagram and are explained with reference thereto can also be implemented in a different order than the order depicted and/or described. Moreover, method steps which relate to a specific feature of a device are interchangeable with exactly this feature of the device, and this likewise holds true the other way around.

Figure 1A:
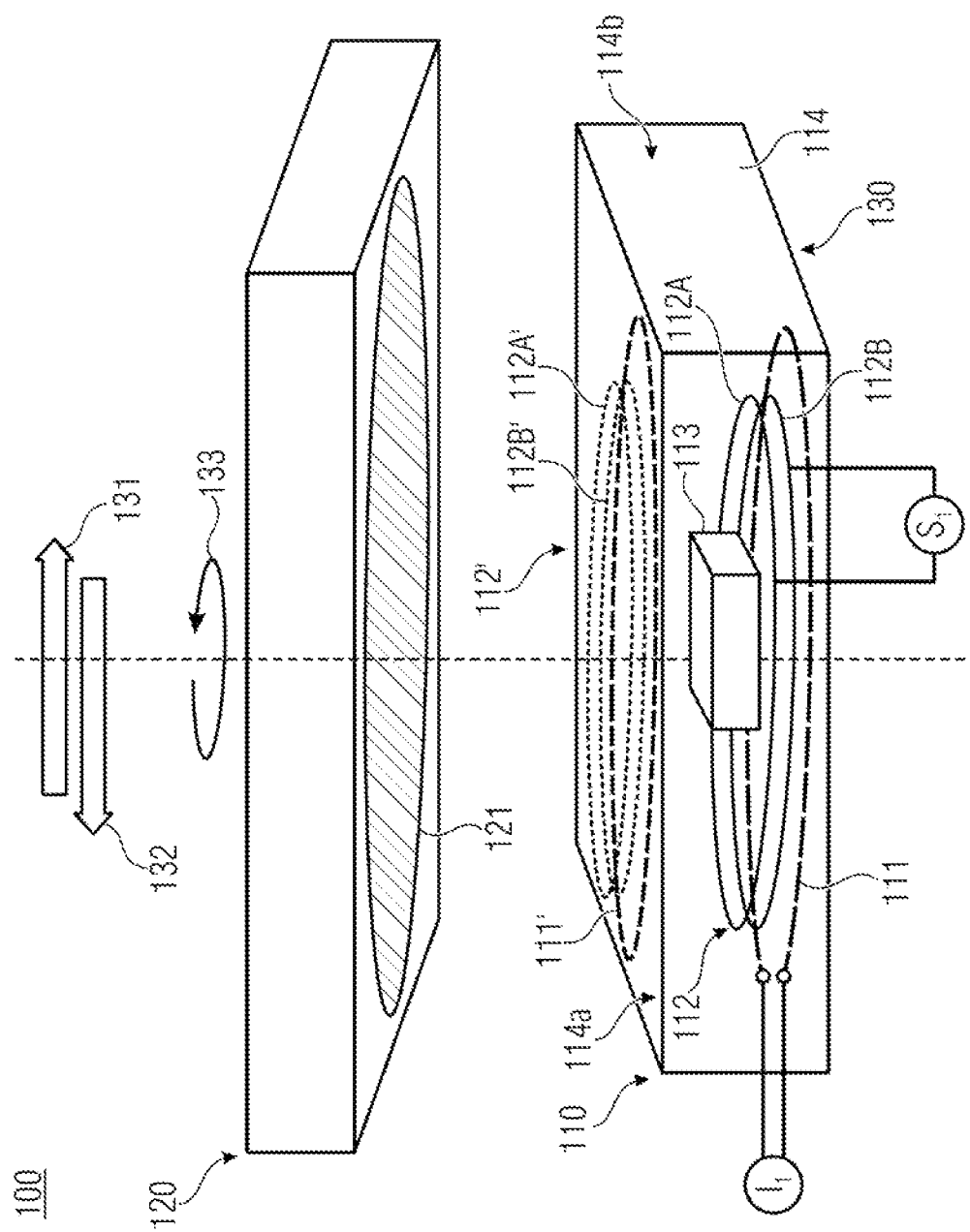
FIG. 1A shows a schematic perspective view of an inductive angle and/or position sensor in accordance with one example implementation.

FIG. 1A shows a non-limiting example implementation of an inductive angle and/or position sensor 100.

The inductive angle and/or position sensor 100 can comprise a first sensor component 110 and a second sensor component 120, which is movable relative thereto. The two sensor components 110, 120 can be movable for example translationally (indicated by the arrows 131, 132) or rotationally (indicated by the arrow 133) with respect to one another.

The first sensor component 110 can comprise an excitation coil 111 and a receiving coil arrangement 112. The receiving coil arrangement 112 can comprise two or more individual receiving coils 112A, 112B.

The second sensor component 120 can comprise an inductive target 121. The inductive target 121 can be configured as a coil or for example in the form of a solid sheet metal part.

The excitation coil 111 can be excited with an AC current h in order to induce an induced current in the inductive target 121. The inductive target 121 can be configured to generate a magnetic field in reaction to the induced current, the magnetic field in turn generating an induction signal $S_1$ in the receiving coil arrangement 112.

The first sensor component 110 can furthermore comprise a semiconductor chip 113 having an integrated circuit configured to determine a position of the second sensor component 120 relative to the first sensor component 110 on the basis of the induction signal. The integrated circuit can comprise for example an ASIC (ASIC: Application Specific Integrated Circuit).

The inductive angle and/or position sensor 100 can furthermore comprise a housing 114, in which the semiconductor chip 113 is arranged. The housing 114 including the chip 113 housed therein can also be referred to as a chip package 130.

The individual receiving coils 112A, 112B of the receiving coil arrangement 112 can be configured in at least two structured metallization layers 200A, 200B spaced apart from one another (see FIG. 2A), which can be arranged within the housing 114 and/or outside on an outer surface of the housing 114. The at least two structured metallization layers 200A, 200B can be spaced apart from one another vertically and/or laterally.

Alternatively or additionally, the excitation coil 111 can be configured in at least one structured metallization layer 200C (see FIG. 2A), which can be arranged within the housing 114 and/or outside on an outer surface of the housing 114.

Both the excitation coil 111 and the receiving coil arrangement 112, or the individual receiving coils 112A, 112B of the receiving coil arrangement 112, can preferably be produced using thin-film technology. By way of example, the abovementioned metallization layers 200A, 200B spaced apart from one another can be structured using thin-film technology for the purpose of producing the receiving coils 112A, 112B. It would likewise be conceivable for the abovementioned metallization layer 200C to be structured using thin-film technology for the purpose of producing the excitation coil 111.

The term thin-film technology can be understood to mean a structured metallization deposition (e.g. using sputtering or vapor deposition—with structuring by lithography). The term thin-film technology can likewise encompass the process when a thin so-called seed layer produced in this way is subsequently also reinforced by a plating process—this can be done electrolytically or in an electroless manner. Dielectric layers can be produced or laminated by spin-on technology.

By contrast, subtractive techniques, for example, such as in printed circuit board manufacture (e.g. etching of copper-clad layers) or the printing of conductive pastes with subsequent curing, for example, would be encompassed by the term thick-film technology. Metallization layers produced using thin-film technology can thus be differentiated structurally from metallization layers produced using thick-film technology.

The advantages of thin-film technology consist in the possibility of realizing smaller structures (both structure widths and structure spacings). In the case of coils (e.g. the excitation coil 111 and/or the receiving coils 112A, 112B), more turns can thus be produced on the same area.

As can be discerned in the schematic view in FIG. 1A, at least one of the two receiving coils 112A, 112B of the receiving coil arrangement 112 can be arranged within the housing 114, which is illustrated by solid lines. Alternatively or additionally, the excitation coil 111 can be arranged within the housing 114, which is likewise illustrated by solid lines.

It would likewise be conceivable that at least one of the two receiving coils of the receiving coil arrangement can be arranged outside on an outer surface 114a, 114b of the housing 114, which is indicated by dashed lines 112', 112A', 112B'. It would also be conceivable that the excitation coil can be arranged outside on an outer surface 114a, 114b of the housing 114, which is likewise indicated by dashed lines 111'.

Thus, both receiving coils 112A, 112B (112A', 112B') of the receiving coil arrangement 112 (112') can be arranged within the housing 114 or outside on an outer surface 114a, 114b of the housing 114. It would likewise be conceivable for at least one of the two receiving coils 112A, 112B of the receiving coil arrangement 112 to be arranged within the housing 114 and for the respective other of the two receiving coils 112B of the receiving coil arrangement 112 to be arranged outside on an outer surface 114a, 114b of the housing 114.

The excitation coil 111 can be arranged within the housing 114 or outside on an outer surface 114a, 114b of the housing 114. It would also be conceivable for a first excitation coil 111 to be arranged within the housing 114 and for a second excitation coil 111' optionally present to be arranged outside on an outer surface 114a, 114b of the housing 114.

The outer surface 114a, 114b of the housing 114 can be substantially a surface defined by the outer contours of the housing 114. By way of example, as is shown in the non-limiting example implementation in FIG. 1A, a top side 114a of the housing 114 can be involved. In this case, the top side 114a would be the outer side of the housing 114 facing away from the first sensor component 110. To put it another way, in this example, the top side 114a would be the outer side of the housing 114 facing the second sensor component 120. To put it more generally, in this example, the top side 114a would be that outer surface 114a of the housing 114 which faces away from that sensor component 110 on which the housing 114 is mounted, or that outer surface 114a of the housing 114 which faces that sensor component 120 on which the housing 114 is not mounted.

However, the outer surface can also be one of the lateral side walls 114b of the housing 114. That is to say that at least one of the receiving coils 112A, 112B of the receiving coil arrangement 112 and/or the excitation coil 111 can be arranged on such a lateral outer side 114b of the housing 114.

As mentioned initially, the individual receiving coils 112A, 112B of the receiving coil arrangement 112 can be implemented in at least two structured metallization layers 200A, 200B spaced apart from one another. The excitation coil 111 can likewise be implemented in a structured metallization layer, which can be one of the two structured metallization layers 200A, 200B in which the receiving coils 112A, 112B are also implemented. Alternatively, the excitation coil 111 can be implemented in a third metallization layer 200C different than the structured metallization layers. All of the structured metallization layers 200A, 200B, 200C just mentioned by way of example can be situated within the housing 114 and/or outside on an outer surface 114a, 114b of the housing 114. The structured metallization layers 200A, 200B, 200C can be produced using thin-film technology.

Figure 1B:
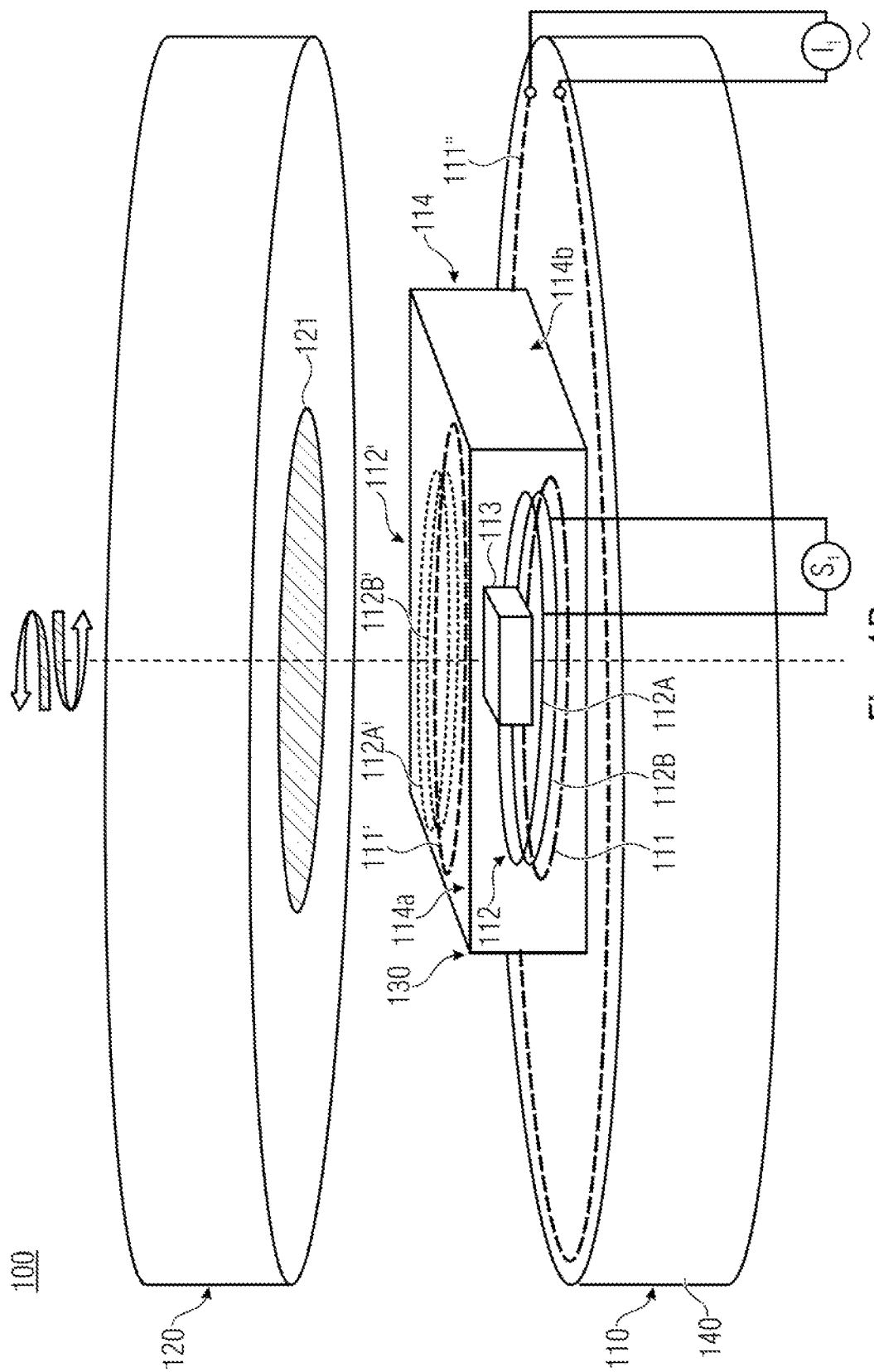
FIG. 1B shows a schematic perspective view of an inductive angle and/or position sensor in accordance with one example implementation.

FIG. 1B shows a further example implementation of an inductive angle and/or position sensor 100. This example implementation is similar to the example implementation discussed above with reference to FIG. 1A, for which reason elements having the same or a similar function are provided with the same reference signs. The non-limiting example implementation illustrated in FIG. 1B differs, inter alia, in that the first sensor component 110 optionally comprises an additional substrate 140 (e.g. a PCB: Printed Circuit Board), on which the abovementioned housing 114 or package 130 can be arranged. Moreover, the excitation coil 111 can optionally be arranged on the substrate 140. For this purpose, the excitation coil 111 can be configured for example in the form of a conductor track on the PCB. In this case, therefore, the excitation coil 111 could be implemented in a structured metallization layer of the PCB, e.g. outside the housing 114.

The inductive angle and/or position sensor 100 illustrated in FIG. 1B can comprise, inter alia, a first sensor component 110. In the implementation illustrated here merely by way of example, the first sensor component 110 can be a stator, for example. The first sensor component 110, in this example the stator, can comprise a substrate 140 (e.g. PCB). The housing 114 or the package 130 can be arranged on the substrate 140.

The inductive angle and/or position sensor 100 can furthermore comprise a second sensor component 120, which is movable relative to the first sensor component 110. The second sensor component 120 can be a rotor, for example. Accordingly, the inductive angle and/or position sensor 100 in accordance with this example implementation would be configured in particular to ascertain an angle between the first sensor component 110 (stator) and the second sensor component 120 (rotor). However, it would likewise be conceivable for the first and second sensor components 110, 120 to be movable translationally, or in a mixed way rotationally and translationally, relative to one another. Moreover, it would be conceivable for the first sensor component 110 to be configured as a rotor, and for the second sensor component 120 to be configured as a stator.

The first sensor component 110, the stator in the example implementation shown here, can comprise an excitation coil 111. FIG. 1B shows various conceivable configurations of the excitation coil 111. By way of example, the excitation coil 111 can be arranged within the housing 114 or the package 130. As mentioned initially, the excitation coil 111 in this case can be implemented in a metallization layer 200A, 200B, 200C which is structured using thin-film technology and which is arranged within the housing 114 or the package 130. Optionally, the excitation coil 111 can be arranged outside, e.g. at or on the housing 114 or the package 130, which is indicated by dashed lines 111'. In this case, too, the excitation coil 111' can be implemented in a metallization layer 200A, 200B, 200C which is structured using thin-film technology, but which is then arranged outside the housing 114 or the package 130. Optionally, the excitation coil 111 can be arranged outside the housing 114 or the package 130 on the substrate 140, which is indicated by dashed lines 111". As described above, the excitation coil 111 can be implemented in the form of a conductor track present on the substrate 140. In this case, too, the excitation coil 111 can be implemented in a metallization layer 200C which is structured using thin-film technology, wherein this metallization layer would then be arranged on the substrate 140, e.g. outside the housing 114 or the package 130.

It would be conceivable for the inductive angle and/or position sensor 100 described herein to comprise more than the one excitation coil 111 described above. In this case, it would be conceivable that for example at least one excitation coil 111 is arranged within the housing 114, optionally at least one further excitation coil 111' is arranged outside on an outer surface of the housing 114, and optionally at least one further excitation coil 111" is arranged outside the housing 114 on the substrate 140. Insofar as an excitation coil is mentioned herein, however, this can be taken to mean all of the implementations 111, 11', 111" just described.

The first sensor component 110 (stator) can furthermore comprise a receiving coil arrangement 112. The receiving coil arrangement 112 can comprise two or more individual receiving coils 112A, 112B.

The second sensor component 120, the rotor in the example implementation shown here, can comprise an inductive target 121. The excitation coil 111 can be able to be excited with an AC current $I_1$ in order to induce an induced current in the inductive target 121. The inductive target 121 in turn can be configured to generate a magnetic field in reaction to this induced current, the magnetic field in turn generating an induction signal $S_1$ in the receiving coil arrangement 112.

The first sensor component 110 can furthermore comprise a semiconductor chip 113 having an integrated circuit configured to determine a position of the second sensor component 120 relative to the first sensor component 110 on the basis of the induction signal. The integrated circuit can comprise for example an ASIC (ASIC: Application Specific Integrated Circuit).

The inductive angle and/or position sensor 100 can furthermore comprise a housing 114, in which the semiconductor chip 113 is arranged. The housing 114 with the chip 113 housed therein can also be referred to as a chip package 130.

The individual receiving coils 112A, 112B of the receiving coil arrangement 112 can be configured in at least two structured metallization layers 200A, 200B spaced apart from one another, which are arranged within the housing 114 and/or outside on an outer surface of the housing 114. The at least two structured metallization layers 200A, 200B can be spaced apart from one another vertically and/or laterally.

Both the excitation coil 111 and the receiving coil arrangement 112, or the individual receiving coils 112A, 112B of the receiving coil arrangement 112, can therefore be produced using thin-film technology. By way of example, the abovementioned metallization layers 200A, 200B spaced apart from one another can be structured using thin-film technology for the purpose of producing the receiving coils 112A, 112B and the at least one metallization layer 200C can be structured using thin-film technology for the purpose of producing the excitation coil 111. The term thin-film technology can be understood to mean a structured metallization deposition (e.g. by using sputtering or vapor deposition—with structuring by lithography). The term thin-film technology can likewise encompass the process when a thin so-called seed layer produced in this way is subsequently also reinforced by a plating process—this can be done electrolytically or in an electroless manner. Dielectric layers can be produced or laminated by spin-on technology.

By contrast, subtractive techniques, for example, such as in printed circuit board manufacture (e.g. etching of copper-clad layers) or the printing of conductive pastes with subsequent curing, for example, would be encompassed by the term thick-film technology. Metallization layers produced using thin-film technology can thus be differentiated structurally from metallization layers produced using thick-film technology.

The advantages of thin-film technology consist in the possibility of realizing smaller structures (both structure widths and structure spacings). In the case of coils, more turns can thus be produced on the same area.

As can be discerned in the schematic view in FIG. 1B, at least one of the individual receiving coils 112A, 112B of the receiving coil arrangement 112 can be arranged within the housing 114, which is illustrated by solid lines. Alternatively or additionally, at least one of the individual receiving coils of the receiving coil arrangement can be arranged outside on an outer surface 114a, 114b of the housing 114, which is illustrated by dashed lines 112', 112A', 112B'. The same applies to the excitation coil 111. The excitation coil 111 can be arranged within the housing 114, which is illustrated by solid lines. Alternatively or additionally, the excitation coil (or optionally a further excitation coil) can be arranged outside on an outer surface 114a, 114b of the housing 114, which is illustrated by dashed lines 111'. Alternatively or additionally, the excitation coil (or optionally a further excitation coil) can be arranged outside the housing 114 on the substrate 140, which is illustrated by dashed lines 111".

By way of example, both receiving coils 112A, 112B of the receiving coil arrangement 112 can be arranged within the housing 114 or outside on an outer surface 114a, 114b of the housing 114. It would likewise be conceivable for at least one of the two receiving coils 112A, 112B of the receiving coil arrangement 112 to be arranged within the housing 114 and for the respective other of the two receiving coils 112B of the receiving coil arrangement 112 to be arranged outside on an outer surface 114a, 114b of the housing 114.

The outer surface 114a, 114b of the housing 114 can be substantially a surface defined by the outer contours of the housing 114. By way of example, as is shown in the non-limiting example implementation in FIG. 1B, a top side 114a of the housing 114 can be involved. In this case, the top side 114a would be the outer side of the housing 114 facing away from the first sensor component 110, the stator in this example. To put it another way, in this example, the top side 114a would be the outer side of the housing 114 facing the second sensor component 120, the rotor in this example. To put it more generally, in this example, the top side 114a would be that outer surface 114a of the housing 114 which faces away from that sensor component 110 on which the housing 114 is mounted, or that outer surface 114a of the housing 114 which faces that sensor component 120 on which the housing 114 is not mounted.

However, the outer surface can also be one of the lateral side walls 114b of the housing 114. That is to say that at least one of the receiving coils 112A, 112B of the receiving coil arrangement 112 can be arranged on such a lateral outer side 114b of the housing 114.

As mentioned initially, the individual receiving coils 112A, 112B of the receiving coil arrangement 112 can be implemented in at least two metallization layers 200A, 200B spaced apart from one another. Alternatively or additionally, the excitation coil 111 can be implemented in at least one metallization layer 200A, 200B, 200C. In this case, the excitation coil 111 can be implemented for example in one of the abovementioned at least two structured metallization layers 200A, 200B spaced apart from one another in which the receiving coils 112A, 112B are also implemented. Alternatively, the excitation coil 111 can be implemented in a third structured metallization layer 200C different than the structured metallization layers. The structured metallization layers 200A, 200B, 200C, in accordance with the discussion above, can be situated within the housing 114 and/or outside on an outer surface 114a, 114b of the housing 114 or on the substrate 140. The structured metallization layers 200A, 200B, 200C can be produced using thin-film technology.

Figure 2A:
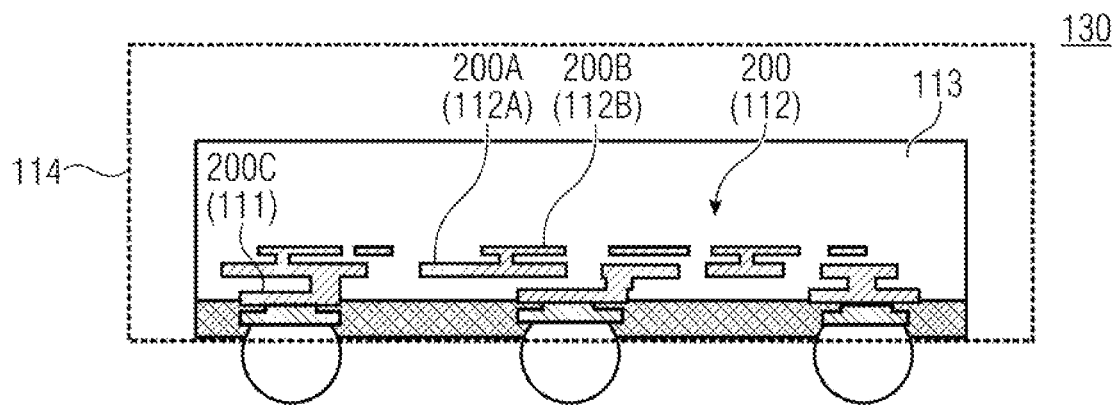
FIG. 2A shows a schematic sectional view of a package with a receiving coil arrangement configured in a chip metallization in accordance with one conceivable example implementation.
Figure 2B:
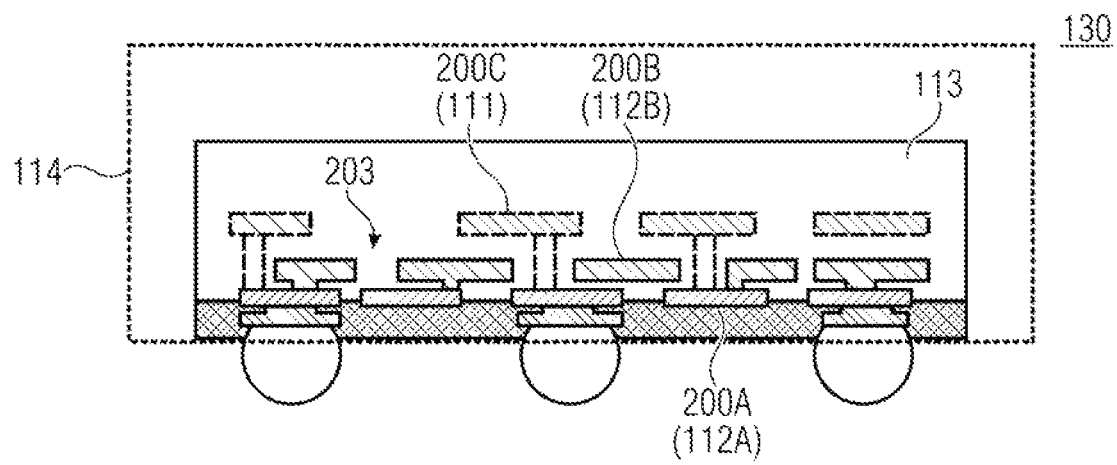
FIG. 2B shows a schematic sectional view of a package with a receiving coil arrangement configured in a redistribution layer within the chip in accordance with one conceivable example implementation.

FIGS. 2A and 2B show example implementations of such metallization layers 200A, 200B, 200C which can be produced using thin-film technology and can be suitable for forming the excitation coil 111 and the receiving coils 112A, 112B.

FIG. 2A shows a semiconductor chip 113 having an integrated circuit for operating the inductive angle and/or position sensor 100. The semiconductor chip 113 can comprise a chip metallization 200 situated within the chip 113. The chip metallization 200 can comprise a multiplicity of integrated chip metallization layers 200A, 200B, 200C arranged in different planes.

The receiving coil arrangement 112 can be configured for example in the form of the chip metallization 200. Alternatively or additionally, the excitation coil 111 can be configured in the form of the chip metallization 200. In accordance with this non-limiting example implementation, for example, at least one of the at least two structured metallization layers spaced apart from one another in which the receiving coils 112A, 112B are configured can be configured in the form of one of the chip metallization layers 200A, 200B, e.g. at least one of the chip metallization layers 200A, 200B can form at least one of the receiving coils 112A, 112B.

Alternatively or additionally, the excitation coil 111, in accordance with this non-limiting example implementation, can be configured in at least one of the chip metallization layers 200A, 200B, 200C of the chip metallization 200, e.g. at least one of the chip metallization layers 200A, 200B, 200C can form the excitation coil 111. By way of example, the excitation coil 111 can be implemented in the chip metallization layer 200C. It would likewise be conceivable for the excitation coil 111 to be implemented in one of the two chip metallization layers 200A, 200B in which the receiving coils 112A, 112B are also configured (not explicitly illustrated). The excitation coil 111 could thus be arranged radially around the receiving coils 112A, 112B, for example.

The chip 113 depicted in FIG. 2A can be fabricated using wafer level packaging (WLP) technology, for example, wherein the housing 114 with the chip 113 housed therein can form a WLP package 130.

FIG. 2B shows a further conceivable implementation of a WLP package 130 comprising a housing 114 and a chip 113 arranged therein. In accordance with this implementation, the WLP package 130 can comprise a redistribution layer section 203, also referred to as redistribution layer, in the fan-in region, e.g. in the region of the footprint of the chip 113 or within the chip 113. The receiving coil arrangement 112 can be configured for example in the form of the RDL 203. Alternatively or additionally, the excitation coil 111 can be configured in the form of the RDL 203.

The redistribution layer 203 can comprise one or a plurality of metallization layers 200A, 200B, 200C spaced apart from one another (e.g. vertically and/or laterally). In this case, at least one of the at least two structured metallization layers spaced apart from one another in which the receiving coils 112A, 112B are configured can be configured within the housing 114 and in the form of one of the metallization layers 200A, 200B of the redistribution layer section 203 in the fan-in region, e.g. at least one of the metallization layers 200A, 200B in the RDL 203 can form at least one of the receiving coils 112A, 112B.

Alternatively or additionally, the at least one structured metallization layer in which the excitation coil 111 can be configured can be configured within the housing 114 and in the form of one of the metallization layers 200A, 200B, 200C of the redistribution layer section 203 in the fan-in region, e.g. at least one of the metallization layers 200A, 200B, 200C in the RDL 203 can form the excitation coil 111.

Figure 2C:
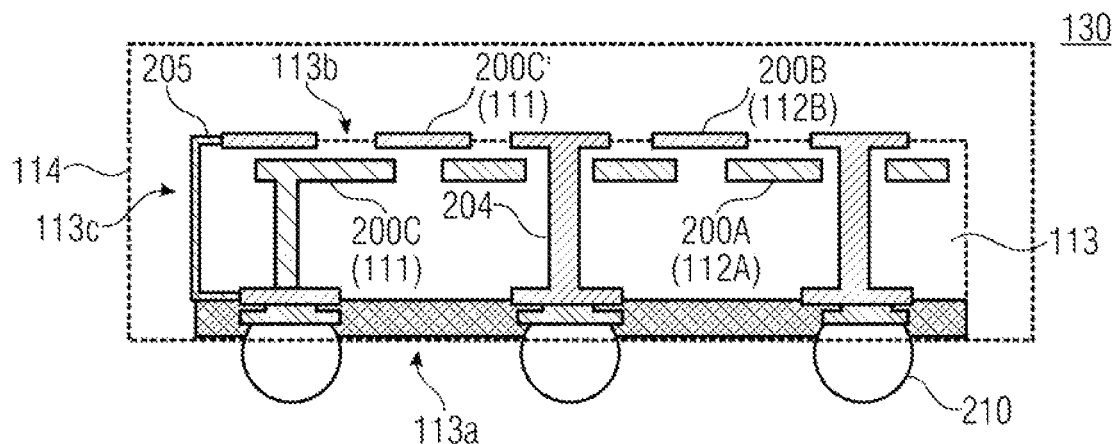
FIG. 2C shows a schematic sectional view of a package with a receiving coil arrangement configured in a backside redistribution layer outside the chip in accordance with one conceivable example implementation.

FIG. 2C shows a further conceivable implementation of a WLP package 130 comprising a housing 114 and a chip 113 arranged therein. The chip 113 comprises a first chip surface 113a and an opposite second chip surface 113b. Contact sections 210 for electrically contacting the chip 113 can be arranged on the first chip surface 113a. The contact sections 210 can comprise for example connection pads, solder balls and the like.

In accordance with the implementation depicted here, at least one structured metallization layer 200A, as described above, can be arranged in the fan-in region, e.g. in the region of the footprint of the chip 113 or within the chip 113. A second structured metallization layer 200B spaced apart therefrom can be arranged for example outside the chip 113 on the second chip surface 113b (and simultaneously in the fan-in region). At least one of the receiving coils 112A, 112B can be configured in at least one of the structured metallization layers 200A, 200B, e.g. at least one of the metallization layers 200A, 200B can form at least one of the receiving coils 112A, 112B.

In accordance with this example implementation, therefore, by way of example, at least one of the at least two structured metallization layers 200A, 200B spaced apart from one another in which the receiving coils 112A, 112B can be configured can be arranged within the housing 114 and outside the chip 113 on the second chip surface 113b. Alternatively, it would be conceivable for both structured metallization layers 200A, 200B spaced apart from one another in which the receiving coils 112A, 112B can be configured to be arranged on the second chip surface 113b.

Alternatively or additionally, at least one structured metallization layer 200C, as described above, can be arranged in the fan-in region, e.g. in the region of the footprint of the chip 113 or within the chip 113. The excitation coil 111 can be implemented in the at least one structured chip metallization layer 200C. Alternatively, the excitation coil 111 can be implemented in a structured metallization layer 200C' that is arranged outside the chip 113 on the second chip surface 113b (and simultaneously in the fan-in region).

The at least one structured metallization layer 200C in which the excitation coil 111 can be configured and/or at least one of the two structured metallization layers 200A, 200B spaced apart from one another in which the receiving coils 112A, 112B can be configured can be galvanically connected to at least one of the contact sections 210 on the opposite first chip surface 113a using a chip via 204 extending through the semiconductor chip 113 between the first chip surface 113a and the second chip surface 113b. The vertical via 204 can be a through silicon via, for example.

As an alternative or in addition to the vertical via 204, at least one of the structured metallization layers 200A, 200B, 200C in which the excitation coil 111 and/or the receiving coils 112A, 112B can be configured can be galvanically connected to at least one of the contact sections 210 on the first chip surface 113a using an electrically conductive structure 205 running laterally at the chip outer contour 113c. The electrically conductive structure 205 can be a conductor track trace, for example.

It should also be pointed out again at this juncture that the excitation coil 111 can indeed also be implemented in one of the at least two structured metallization layers 200A, 200B spaced apart from one another in which the receiving coils 112A, 112B are also implemented.

It is additionally conceivable for the implementations discussed with reference to FIGS. 2A, 2B and 2C to be combined among one another. Thus, by way of example, at least one of the at least two structured metallization layers 200A, 200B spaced apart from one another in which the receiving coils 112A, 112B can be configured could be configured within the housing 114 and in the form of a chip metallization layer 200A, 200B and/or in the form of a metallization layer 200A, 200B in the redistribution layer 203 and/or in the form of a metallization layer 200A, 200B on a chip outer surface/second chip surface 113b. Moreover, by way of example, the at least one structured metallization layer in which the excitation coil 111 can be configured could be configured within the housing 114 and in the form of one of the chip metallization layers 200A, 200B, 200C and/or in the form of a metallization layer 200A, 200B, 200C in the redistribution layer 203 and/or in the form of a metallization layer 200A, 200B, 200C on a chip outer surface/second chip surface 113b.

Figure 3A:
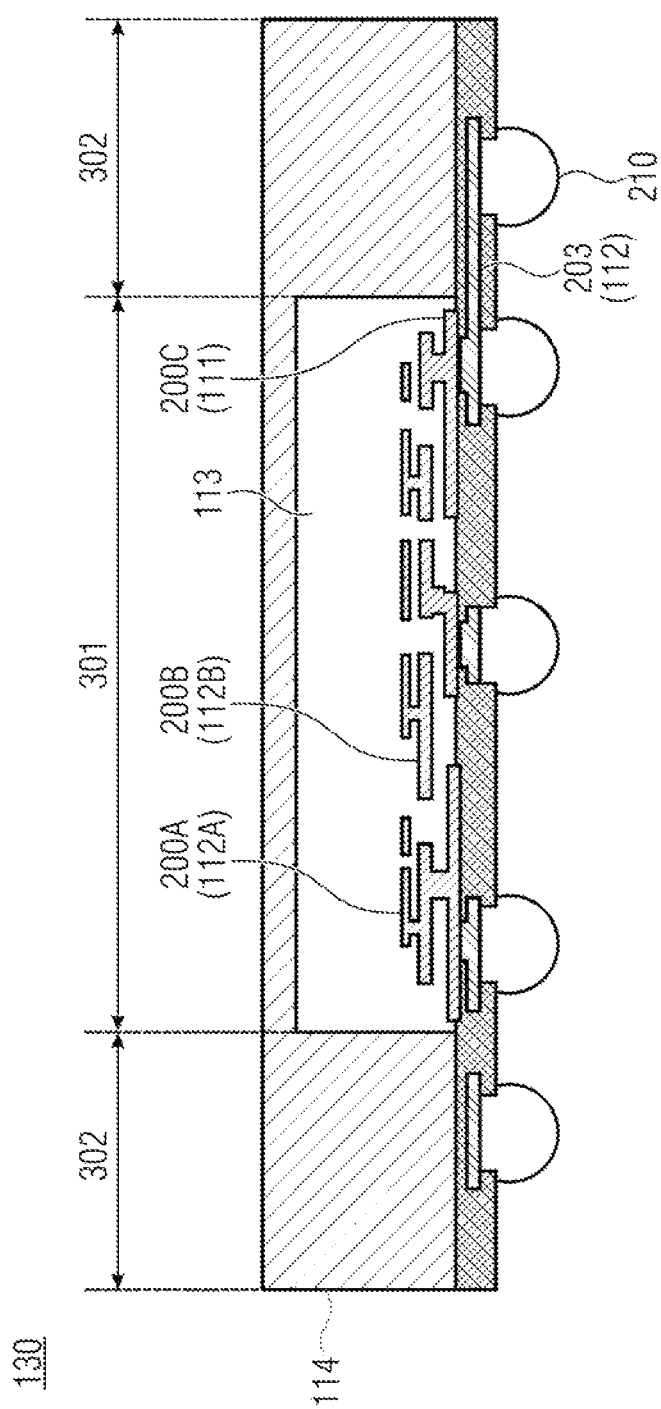
FIG. 3A shows a schematic sectional view of a package with a receiving coil arrangement configured in a redistribution layer in the fan-in region and/or fan-out region of an eWLB package in accordance with one conceivable example implementation.

FIG. 3A shows a further example implementation of a chip package 130 comprising a housing 114 and a chip 113 arranged therein. The package 130 depicted here can be a WLB or eWLB package (WLB: Wafer Level Ball Grid Array; eWLB: embedded Wafer Level Ball Grid Array).

In WLB and eWLB technology, individual chips are positioned at a distance from one another and potted with a potting compound. The potting compound can comprise for example an electrically insulating material, for example a polymer. Curing the potting compound gives rise to an artificial wafer that forms a frame composed of potting compound (mold frame) around the chips. Additional soldering contacts 210 can be arranged on the artificial wafer, the so-called reconstitution. The soldering contacts 210 can be arranged in the fan-in region 301, e.g. in the region of the footprint of the chip 113. Alternatively or additionally, soldering contacts 210 can be arranged in the fan-out region 302, e.g. in the region outside the footprint of the chip 113. After the production of the reconstitution, as in traditional wafer level packages, electrical connections 203 to the soldering contacts 210 can be produced. These electrical connections 203 can be produced in one or more metallization planes or in connection layers, which can also be referred to as redistribution layer (RDL), using thin-film technology.

In the example implementation shown in FIG. 3A, it is evident that the eWLB package 130 depicted here can comprise a redistribution layer 203 that extends into the fan-out region 302, e.g. into a region outside the footprint of the chip 113. The excitation coil 111 and/or the receiving coil arrangement 112 can be configured in the redistribution layer 203, for example.

Figure 3B:
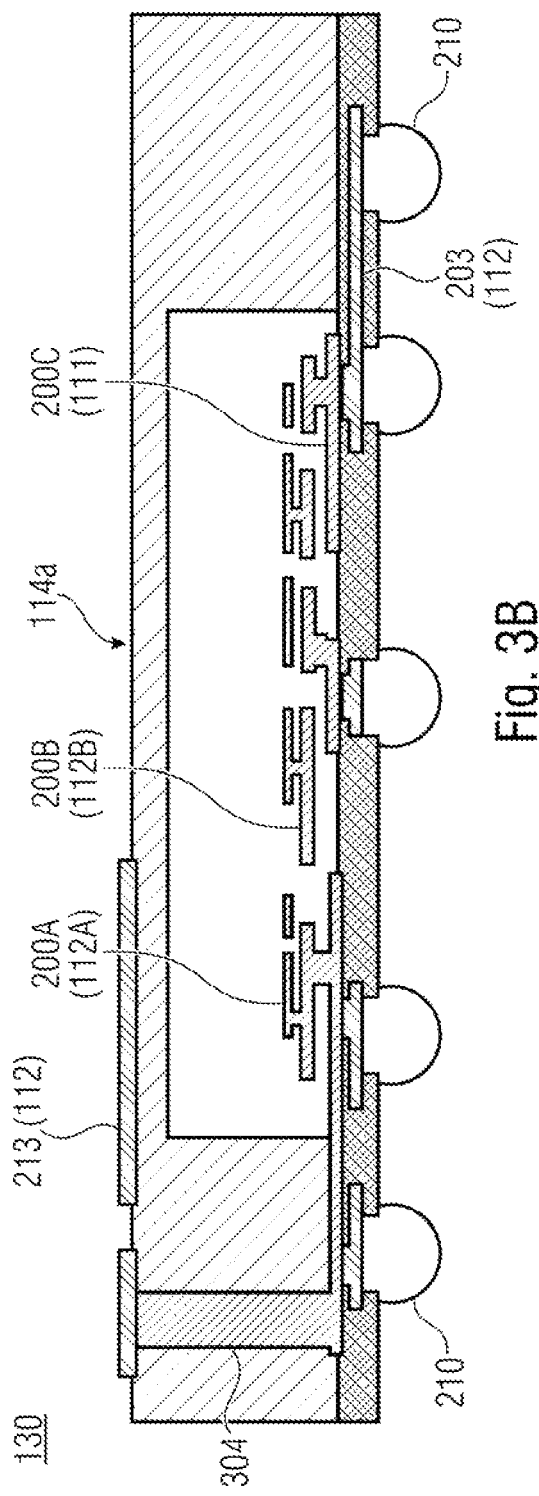
FIG. 3B shows a schematic sectional view of a package with a receiving coil arrangement configured in a redistribution layer within the chip, and with an additional vertical via, in accordance with one conceivable example implementation.

The redistribution layer 203 can comprise a plurality of structured metallization layers 200A, 200B, 200C spaced apart from one another, wherein at least one of the latter likewise extends into the fan-out region 302 (see e.g. FIG. 3B). At least one of the receiving coils 112A, 112B and/or the excitation coil 111 can be configured in the form of one of the structured metallization layers 200A, 200B, 200C in the redistribution layer 203.

In other words, therefore, at least one of the at least two structured metallization layers 200A, 200B spaced apart from one another in which the receiving coils 112A, 112B can be configured can be configured within the housing 114 and in the form of at least one of the metallization layers of the redistribution layer section 203 in the fan-out region 302. Alternatively or additionally, the at least one structured metallization layer in which the excitation coil 111 can be implemented can be configured within the housing 114 and in the form of at least one of the metallization layers 200A, 200B, 200C of the redistribution layer section 203 in the fan-out region 302.

Alternatively or additionally, it would be conceivable for at least one of the at least two structured metallization layers 200A, 200B spaced apart from one another in which the receiving coils 112A, 112B can be configured to be configured within the housing 114 and in the form of at least one of the metallization layers of the redistribution layer section 203 in the fan-in region 301 (see also FIG. 2B). Alternatively or additionally, the at least one structured metallization layer in which the excitation coil 111 can be implemented can be configured within the housing 114 and in the form of at least one of the metallization layers 200A, 200B, 200C of the redistribution layer section 203 in the fan-in region 301 (see also FIG. 2B).

Further alternatively or additionally, it would be conceivable for at least one of the at least two structured metallization layers 200A, 200B spaced apart from one another in which the receiving coils 112A, 112B can be configured to be configured within the housing 114 and in the form of at least one of the chip metallization layers within the chip 113 (see also FIG. 2A). Likewise alternatively or additionally, it would be conceivable for the at least one structured metallization layer in which the excitation coil 111 can be configured to be configured within the housing 114 and in the form of at least one of the chip metallization layers 200A, 200B, 200C within the chip 113 (see also FIG. 2A).

FIG. 3B shows a further example implementation of an eWLB package 130 comprising a housing 114 and a chip 113 arranged therein. In addition to the implementation discussed above with reference to FIG. 3A, the eWLB package 130 from FIG. 3B can comprise a so-called backside redistribution layer 213. This backside RDL 213 can be arranged on an outer contour 114a of the housing 114, or on a housing surface 114a, situated opposite the contact sections 210. The backside RDL 213 can thus be arranged outside the housing 114. The backside RDL 213 can extend laterally at least in sections in the fan-in region 301 and/or at least in sections in the fan-out region 302. The receiving coil arrangement 112 and/or the excitation coil 111 can be configured in the backside RDL 213.

The backside RDL 213 can also comprise a plurality of structured metallization layers spaced apart from one another (not explicitly illustrated here). In this case, at least one of the two receiving coils 112A, 112B can be configured in the form of one of the structured metallization layers of the backside RDL 213. In other words, therefore, at least one of the at least two structured metallization layers spaced apart from one another in which the receiving coils 112A, 112B can be configured can be configured outside the housing 114 and in the form of at least one of the structured metallization layers of the redistribution layer section 213 on the housing surface 114a in the fan-out region 302 and/or in the fan-in region 301. Alternatively or additionally, the excitation coil 111 can be configured in the form of one of the structured metallization layers of the backside RDL 213. In other words, therefore, the at least one structured metallization layer in which the excitation coil 111 can be configured can be configured outside the housing 114 and in the form of at least one of the structured metallization layers of the redistribution layer section 213 on the housing surface 114a in the fan-out region 302 and/or in the fan-in region 301.

It is likewise conceivable that the implementations discussed with reference to FIGS. 3A and 3B can be combined among one another. In this regard, for example, at least one of the at least two structured metallization layers spaced apart from one another in which the receiving coils 112A, 112B can be configured can be configured within the housing 114 and in the form of one of the structured metallization layers of the redistribution layer section 203 in the fan-out region 302 (FIG. 3A), and at least one of the at least two structured metallization layers spaced apart from one another in which the receiving coils 112A, 112B can be configured can be configured outside the housing 114 and in the form of at least one of the metallization layers of the redistribution layer section 213 on the housing surface 114a in the fan-out region 302 and/or in the fan-in region 301 (FIG. 3B). Alternatively or additionally, the at least one structured metallization layer in which the excitation coil 111 can be configured can be configured within the housing 114 and in the form of one of the structured metallization layers 200A, 200B, 200C of the redistribution layer section 203 in the fan-out region 302 (FIG. 3A). Alternatively, the excitation coil 111, or additionally a further excitation coil optionally present, can be configured in at least one of the structured metallization layers 200A, 200B, 200C spaced apart from one another in the backside RDL 213, e.g. outside the housing 114 or on the housing surface 114a in the fan-out region 302 and/or in the fan-in region 301 (FIG. 3B).

In the non-limiting example implementation shown in FIG. 3B, a vertical via 304 can be provided. The vertical via 304 can extend for example from the abovementioned housing surface 114a toward an opposite side of the housing 114. The vertical via 304 can extend for example partly or completely through the package or the housing 114. The vertical via can be for example a through mold via (TMV) that extends through the potting compound, but not through the chip 113.

The vertical via 304 can galvanically connect the backside RDL 213 to one of the contact sections 210. Thus, if at least one of the two receiving coils 112A, 112B is configured in one of the structured metallization layers in the backside RDL 213, the respective receiving coil 112A, 112B can be connected to an opposite contact section 210 using the vertical via 304. If the excitation coil 111 is configured in one of the structured metallization layers 200A, 200B, 200C in the backside RDL 213, the excitation coil 111 can be connected to an opposite contact section 210 using the vertical via 304.

Figure 3C:
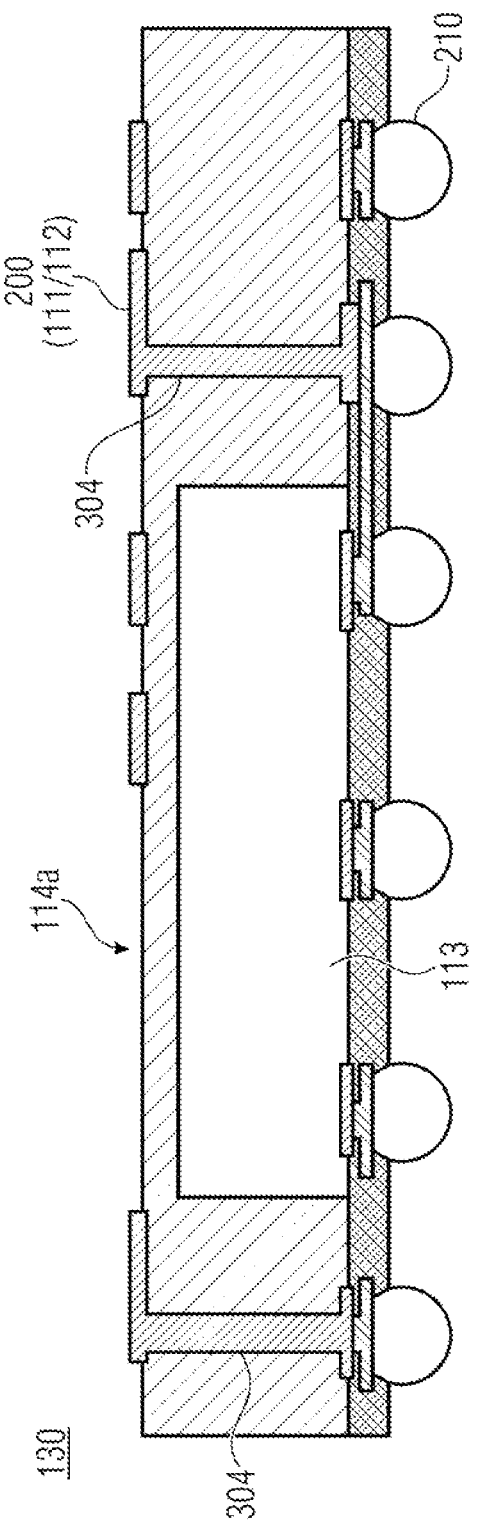
FIG. 3C shows a schematic sectional view of a package with a receiving coil arrangement configured in a backside redistribution layer on an outer side of the package in accordance with one conceivable example implementation.

FIG. 3C shows a further example implementation of a package 130 for an inductive angle and/or position sensor 100. This implementation is substantially similar to the implementation described above with reference to FIG. 3B, for which reason elements having a similar or the same function are provided with the same reference signs. One difference is that, instead of the backside RDL 213 described above, a metallization 200 is arranged on the housing surface 114a. The metallization 200 can comprise one or more structured metallization layers spaced apart from one another (not explicitly illustrated here). The metallization 200 can be deposited on the housing 114, or on the potting compound, for example using an electroplating method and can be correspondingly structured, if appropriate, for example using lithography methods.

The receiving coil arrangement 112 and/or the excitation coil 111 can be configured for example in the form of the metallization 200. Accordingly, at least one of the at least two structured metallization layers spaced apart from one another in which the receiving coils 112A, 112B can be configured can be configured in the form of at least one of the structured metallization layers of the metallization 200. Alternatively or additionally, the at least one structured metallization layer in which the excitation coil 111 can be configured could be configured in the form of at least one of the structured metallization layers of the metallization 200.

Figure 4:
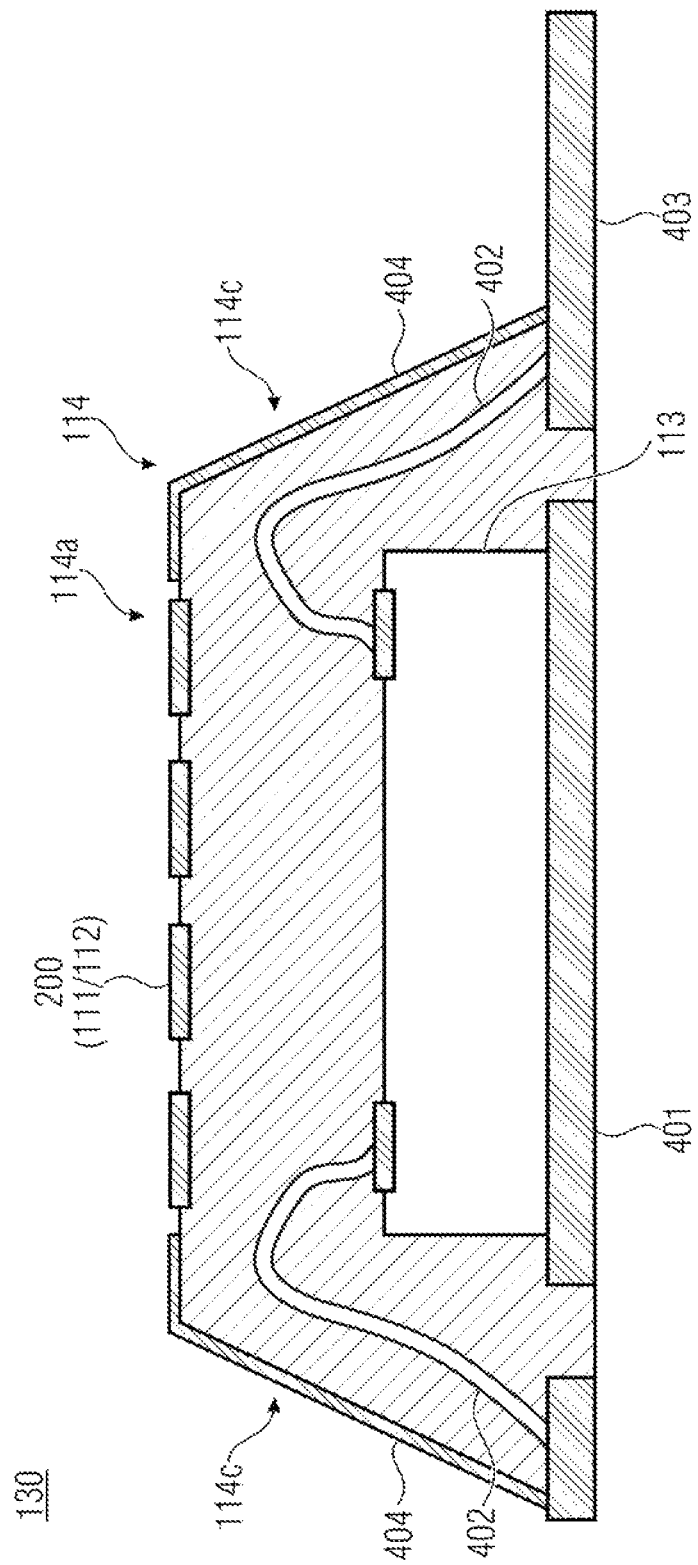
FIG. 4 shows a schematic sectional view of a wire bond package with a receiving coil arrangement configured in a metallization on an outer side of the package in accordance with one conceivable example implementation.

FIG. 4 shows a further implementation of a package 130 for an inductive angle and/or position sensor 100. The chip 113 can be arranged on a substrate 401 and can be potted with a potting compound. The substrate 401 and the potting compound can jointly form the housing 114, in which the chip 113 is arranged. The housing 114 and the chip 113 arranged therein can in turn form a package 130. In the present, non-limiting, example implementation, the package can be a wire bond (WB) package 130, for example. In this case, the chip 113 can be connected to one or more electrically conductive sections 403 on the substrate 401 using bond wires 402, for example.

A metallization 200 can be arranged on an outer contour surface 114a of the housing 114, or on the potting compound, situated opposite the substrate 401. The metallization 200 can comprise one or more structured metallization layers spaced apart from one another (not explicitly illustrated here). The metallization 200 can be deposited on the housing 114, or on the potting compound, for example using an electroplating method and can be correspondingly structured, if appropriate, for example using lithography methods.

The excitation coil 111 and/or the receiving coil arrangement 112 can be configured in the form of the metallization 200, for example. Accordingly, at least one of the at least two structured metallization layers spaced apart from one another in which the receiving coils 112A, 112B can be configured can be configured in the form of at least one of the structured metallization layers of the metallization 200. Alternatively or additionally, the at least one structured metallization layer in which the excitation coil 111 can be configured could be configured in the form of at least one of the structured metallization layers of the metallization 200.

By way of example, it may be conceivable for the metallization 200 to comprise at least two structured metallization layers spaced apart from one another, and for both receiving coils 112A, 112B to be configured respectively in one of the two metallization layers. In principle, in all of the example implementations described herein, it may be conceivable for the two receiving coils 112A, 112B to be arranged vertically one above the other or laterally next to one another, for example. By way of example, one of the two receiving coils 112A, 112B could laterally surround the respective other receiving coil 112A, 112B, e.g. one of the two receiving coils 112A, 112B could be arranged (e.g. centrally) within the other receiving coil 112A, 112B.

As is furthermore evident in FIG. 4, the housing 114 can have a lateral outer contour surface 114c between the substrate 401 and the outer contour surface 114a which is situated opposite the substrate 401 and on which the metallization 200 is arranged. The lateral outer contour surface can be a lateral side wall of the housing 114.

An electrically conductive structure 404 can be arranged on the lateral outer contour surface 114c. The structure can be a further metallization, for example. The further metallization 404 can be deposited on the housing surface, or on the potting compound, for example using electroplating. At least one of the structured metallization layers of the metallization 200 arranged on the top side 114a of the package can be galvanically connected to the substrate 401 using the electrically conductive structure 404. That is to say that the excitation coil 111 and/or at least one of the two receiving coils 112A, 112B could be galvanically connected to a connection region on the substrate 401 using the electrically conductive structure 404. As an alternative or in addition to the deposited metallization, the electrically conductive structure 404 can be able to be realized using bent sections of a leadframe or using bond wires, for example.

FIGS. 5A to 5D show schematic views of various implementations of packages 130, for an inductive angle and/or position sensor 100. The excitation coil 111 and/or the receiving coil arrangement 112 can be configured in one of the implementation variants described herein and can be arranged within the housing 114 and/or outside on an outer surface 114a, 114b of the housing 114.

Figure 5A:
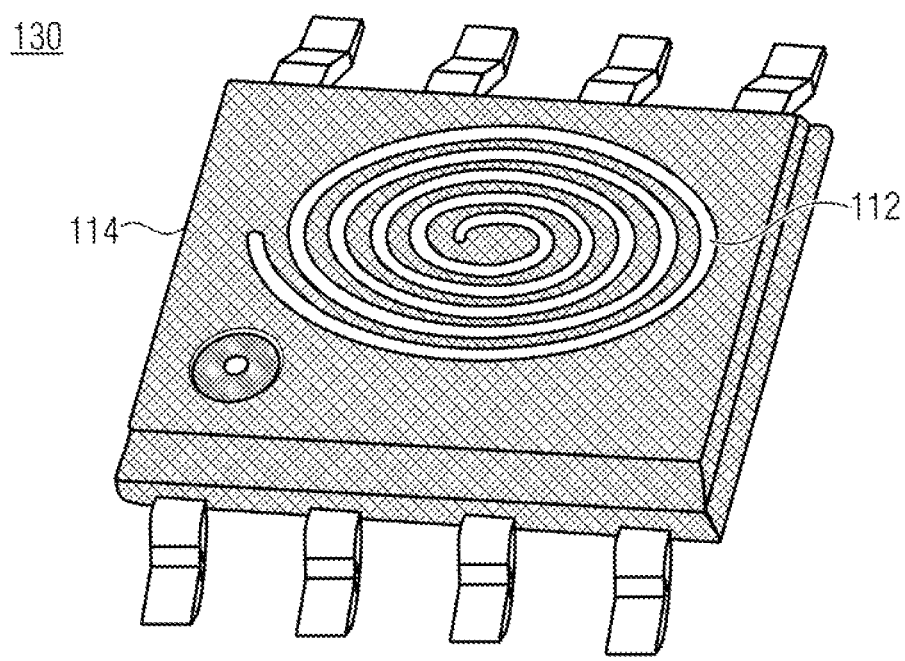
FIGS. 5A-5D show schematic sectional views of different package types with a receiving coil arrangement arranged within or on an outer side of the respective package in accordance with one conceivable example implementation.
Figure 5B:
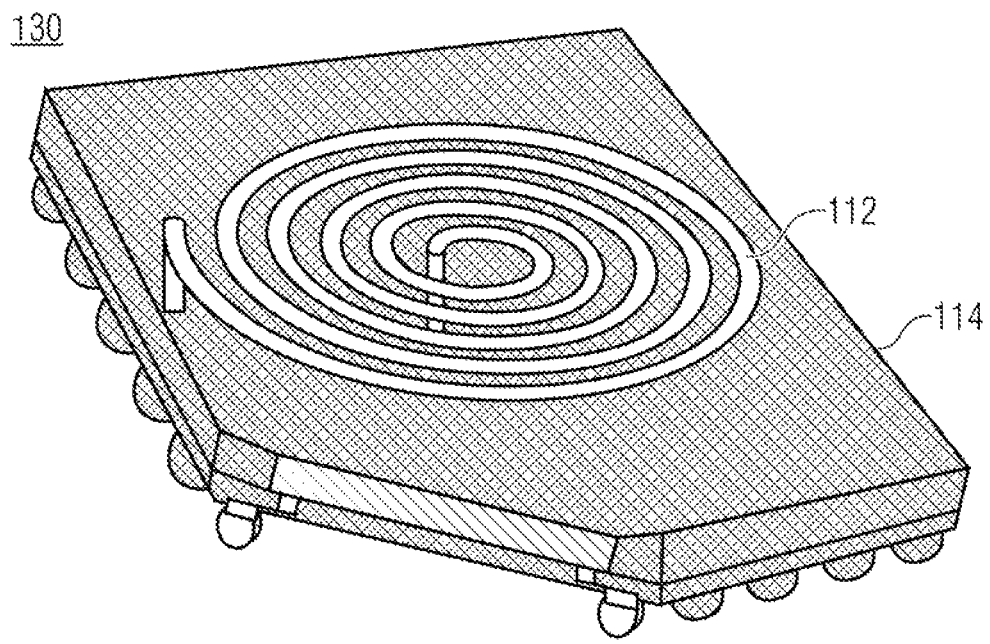
Figure 5C:
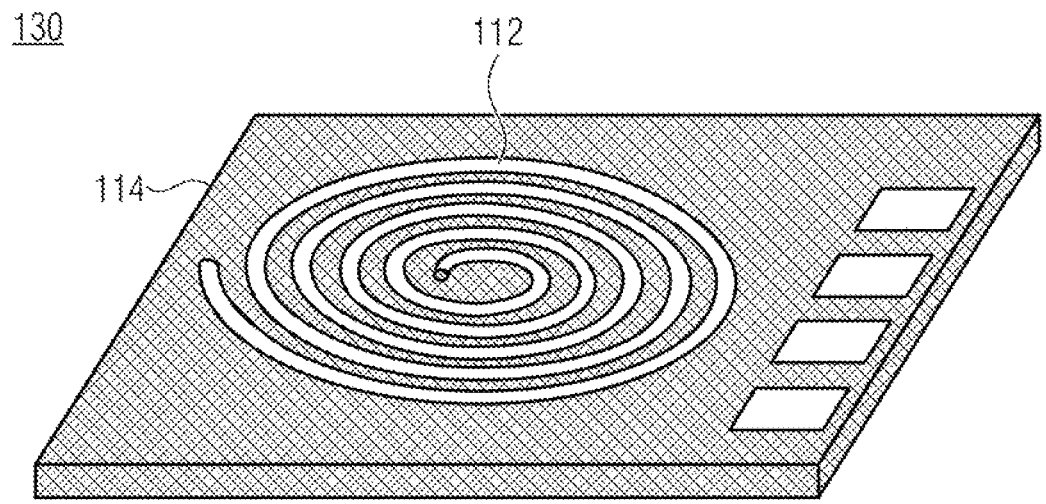
Figure 5D:
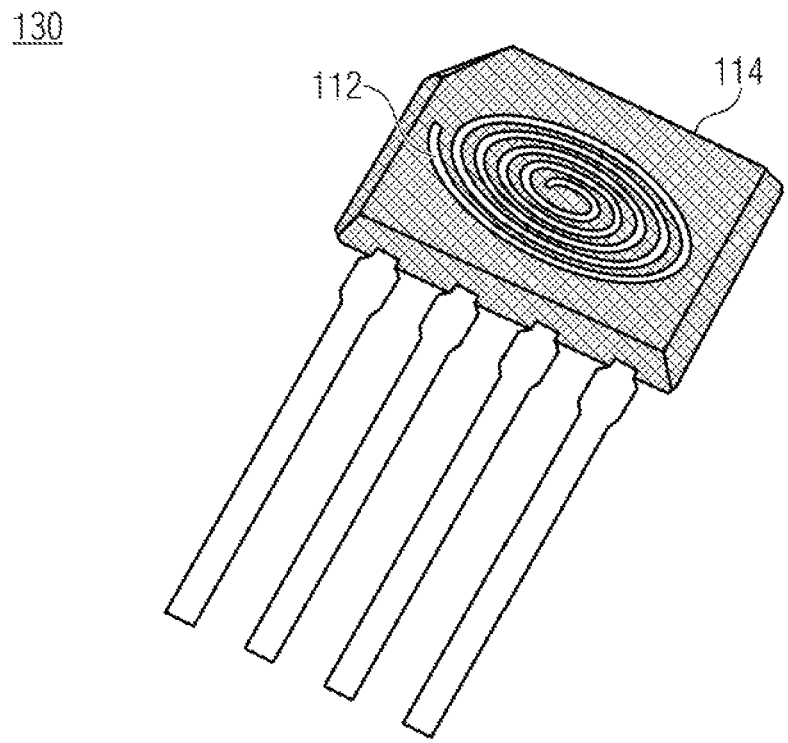

The package forms can be for example an SMD package (FIG. 5A), a WLB or eWLB package (FIG. 5B), a leadframe package (FIG. 5C) or a component package having external soldering lugs, for example a THT package (THT: Through Hole Technology) (FIG. 5D).

Figure 6:
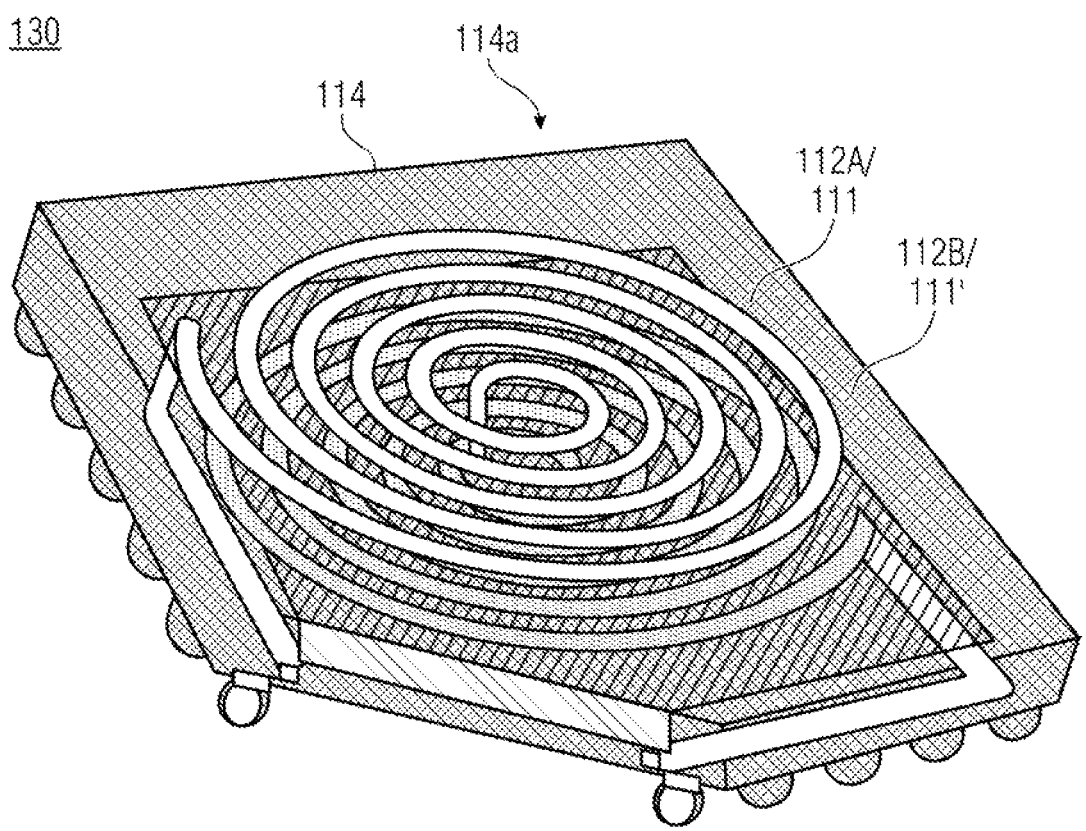
FIG. 6 shows a schematic view of a package with a receiving coil arrangement, wherein a first receiving coil of the receiving coil arrangement is configured in a metallization on an outer side of the package and a second receiving coil of the receiving coil arrangement is configured in a metallization within the package, in accordance with one conceivable example implementation.

FIG. 6 shows purely by way of example a combined implementation on the basis of an eWLB package 130. One of the two receiving coils 112A, 112B, here e.g. the first receiving coil 112A, can be arranged outside the housing 114 on a housing outer surface 114a (see e.g. FIGS. 3B, 3C, 4A). The other of the two receiving coils 112A, 112B, here the second receiving coil 112B, can be arranged within the housing 114 (see e.g. FIGS. 2A-2C, 3A, 3B). Alternatively or additionally, the excitation coil 111 can be arranged outside the housing 114 on a housing outer surface 114a (see e.g. FIGS. 3B, 3C, 4A). Alternatively, the excitation coil 111, or if appropriate optionally a further excitation coil 11', can be arranged within the housing 114 (see e.g. FIGS. 2A-2C, 3A, 3B).

FIG. 7A shows one example for the integration of the package 130 of an inductive angle and/or position sensor 100 in accordance with the concept described herein. The package 130 is illustrated here purely by way of example as an eWLB package. Using the contact sections 210, the package 130 can be arranged on a printed circuit board 701, for example a component board or PCB.

Figure 7B:
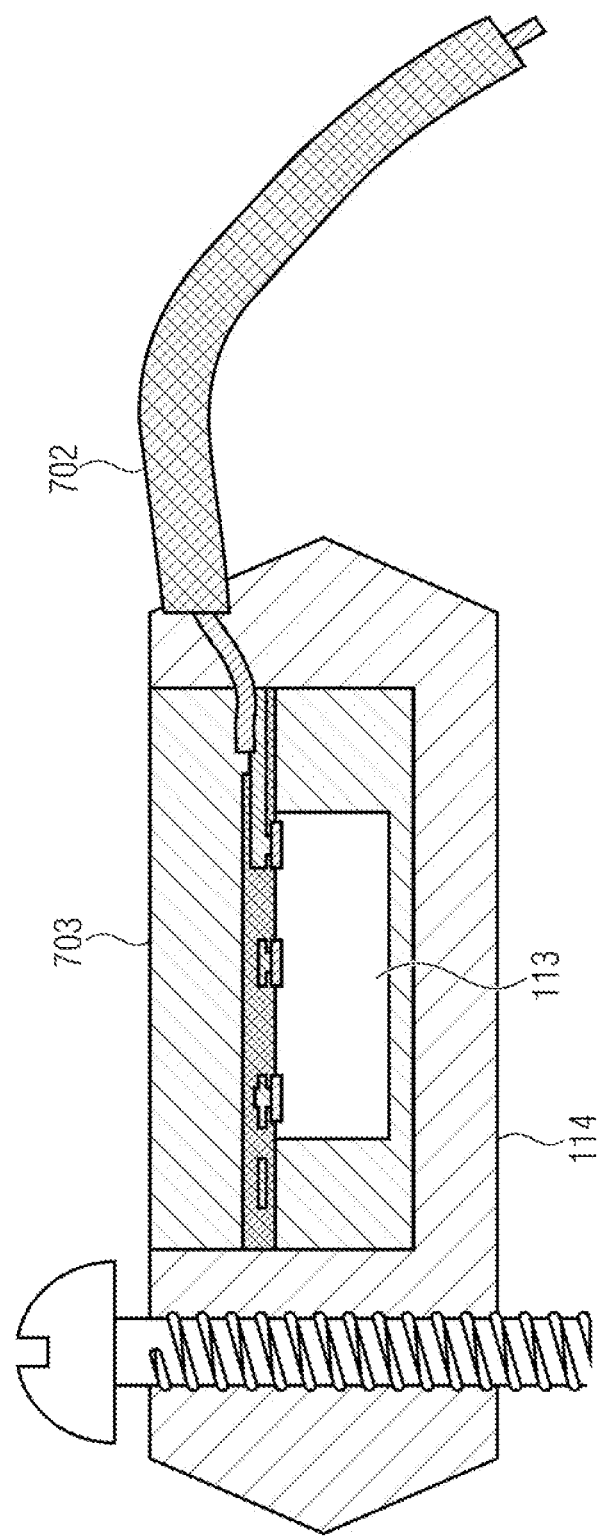
FIG. 7B shows a schematic sectional view of a package with a receiving coil arrangement, wherein the package is embodied with no printed circuit board, in accordance with one conceivable example implementation.

FIG. 7B shows an alternative example implementation. Here the package 130, that is to say the housing 114 including the chip 113 arranged therein, is embodied with no printed circuit board. That is to say that the package 130 can be provided directly with connections 702 with no printed circuit board being present, and can optionally be potted with a potting compound 703. This would be conceivable for example in the case of leadframe packages (FIG. 5C), in the case of component packages having external soldering lugs (FIG. 5D) and in the case of wire bond packages (FIG. 4).

Figure 8:
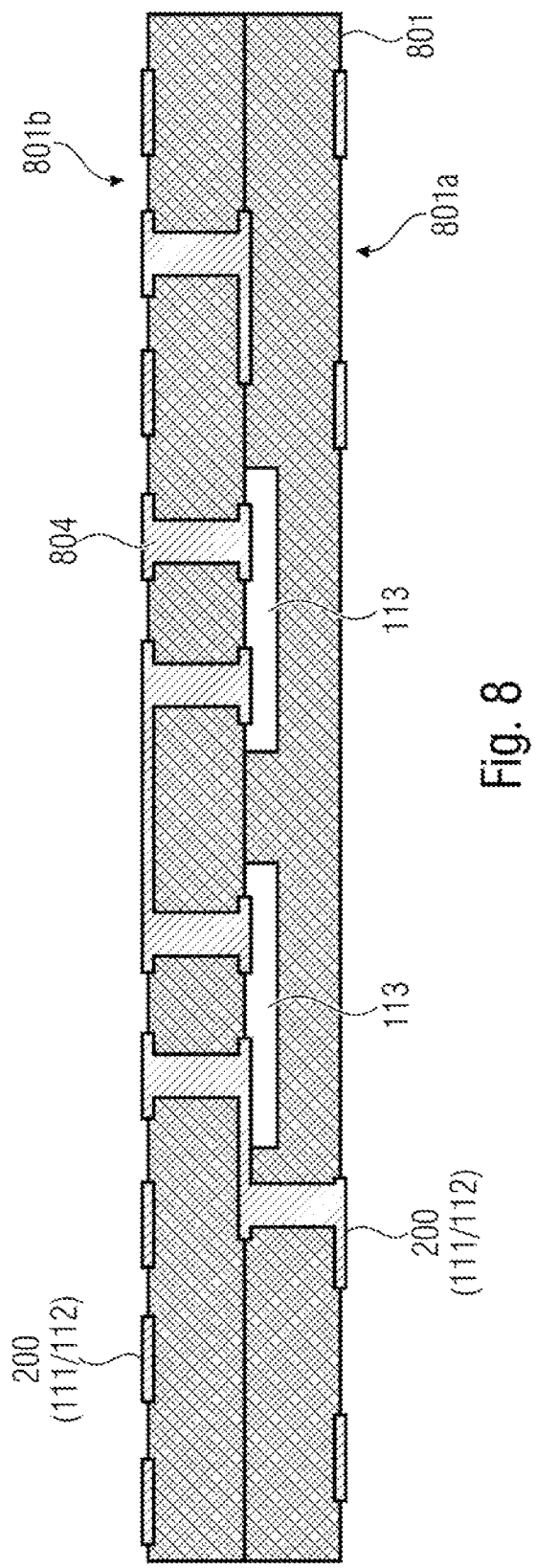
FIG. 8 shows a schematic sectional view of two semiconductor chips, which are integrated in a printed circuit board, and with a receiving coil arrangement configured in a metallization on a printed circuit board surface, in accordance with one conceivable example implementation.

FIG. 8 shows a further example implementation. One or more semiconductor chips 113 can be integrated in a printed circuit board 801. In this case, the printed circuit board 801 can form the housing 114 or replace the housing 114. The printed circuit board 801 can comprise a first printed circuit board surface 801a and an opposite second printed circuit board surface 801b.

A printed circuit board metallization 200 comprising one or more structured printed circuit board metallization layers spaced apart from one another (not explicitly illustrated here) can be arranged on at least one of the printed circuit board surfaces 801a, 801b. In the example implementation shown in FIG. 8, a printed circuit board metallization 200 can be arranged on the first printed circuit board surface 801a and a further printed circuit board metallization 200 can be arranged on the second printed circuit board surface 801b.

The printed circuit board metallization 200 can be deposited on the housing, or on the printed circuit board 801, for example using an electroplating method and can be correspondingly structured, if appropriate, for example using lithography methods.

The excitation coil 111 and/or the receiving coil arrangement 112 can be configured for example in the form of the metallization 200. Accordingly, at least one of the at least two structured metallization layers spaced apart from one another in which the receiving coils 112A, 112B can be configured can be configured outside the housing or the printed circuit board 801 and in the form of at least one of the printed circuit board metallization layers of the printed circuit board metallization 200. Alternatively or additionally, the at least one structured metallization layer in which the excitation coil 111 can be configured could be configured outside the housing or the printed circuit board 801 and in the form of at least one of the printed circuit board metallization layers of the printed circuit board metallization 200.

It would therefore be conceivable, for example, that the excitation coil 111 and/or one or both of the receiving coils 112A, 112B of the receiving coil arrangement 112 can be configured in the form of the printed circuit board metallization 200 arranged on the first printed circuit board surface 801a. Alternatively or additionally, it would be conceivable that the excitation coil 111 and/or one or both of the receiving coils 112A, 112B of the receiving coil arrangement 112 can be configured in the form of the printed circuit board metallization 200 arranged on the second printed circuit board surface 801b. Alternatively or additionally, it would be conceivable that one of the two receiving coils 112A, 112B of the receiving coil arrangement 112 can be configured in the form of the printed circuit board metallization 200 arranged on the first printed circuit board surface 801a, and the respective other of the two receiving coils 112A, 112B of the receiving coil arrangement 112 can be configured in the form of the printed circuit board metallization 200 arranged on the second printed circuit board surface 801b. Further alternatively or additionally, it would be conceivable that the excitation coil 111 can be configured in the form of the printed circuit board metallization 200 arranged on the first printed circuit board surface 801a. Alternatively, the excitation coil 111, or if appropriate optionally a further excitation coil 11', can be configured in the form of the printed circuit board metallization 200 arranged on the second printed circuit board surface 801b.

The excitation coil 111 and/or the receiving coil arrangement 112 can be connected to one or more semiconductor chips 113 using vertical vias 804, for example. By way of example, the excitation coil 111 and/or one of the two receiving coils 112A, 112B of the receiving coil arrangement 112 can be connected to a first semiconductor chip 113 using a first vertical via 804. The respective other of the two receiving coils 112A, 112B of the receiving coil arrangement 112 can be connected to a second semiconductor chip 113 using a second vertical via 804. Alternatively, the excitation coil 111, or if appropriate optionally a further excitation coil 11', can be connected to the second semiconductor chip 113 using the second vertical via 804.

A further dielectric layer (not illustrated) can optionally be arranged on one of the two printed circuit board surfaces 801a, 801b. The further dielectric layer, for its part, can comprise a metallization comprising one or more structured metallization layers spaced apart from one another. At least one of the at least two structured metallization layers spaced apart from one another in which the receiving coils 112A, 112B are configured can be configured in the form of at least one of the structured metallization layers of the further metallization. Alternatively or additionally, the at least one structured metallization layer in which the excitation coil 111 can be configured can be configured in the form of at least one of the structured metallization layers of the further metallization.

Additional electrical contact pads can be provided on at least one of the two printed circuit board surfaces 801a, 801b. Moreover, further components (not illustrated), for example SMD components, can be arranged on at least one of the two printed circuit board surfaces 801a, 801b.

The example implementation illustrated in FIG. 8 affords the possibility of producing a very compact inductive angle and/or position sensor 100, wherein despite the production of the excitation coil 111 and/or the receiving coil arrangement 112 using thin-film technology, it is possible to realize comparatively large dimensions of the respective coils 111, 112A, 112B. This affords a cost-effective alternative to conventional fan-out wafer level packaging (FOWLP) methods.

Moreover, everything that has been described herein by way of example on the basis of the receiving coils 112A, 112B of the receiving coil arrangement 112 can also apply to the excitation coil 111 in the same vein. In this case, the receiving coil arrangement 112, or at least one of the two receiving coils 112A, 112B, could analogously be replaced by the excitation coil 111.

It would be conceivable, for example, that the excitation coil 111 is arranged within the housing 114 or outside on an outer surface 114a, 114b of the housing 114 and is configured in a structured metallization layer 200A, 200B, 200C by virtue of the fact that
  a) the excitation coil 111 is configured in the form of a metallization layer 200A, 200B, 200C integrated in the semiconductor chip 113 (FIG. 2A to 2C), or
  b) the excitation coil 111 is configured in the form of a metallization layer 200A, 200B, 200C arranged on a second chip surface 113b of the semiconductor chip 113 situated opposite a first chip surface 113a comprising chip contact pads 210 (FIG. 2C), or
  c) the excitation coil 111 is embodied in the form of a metallization layer 200A, 200B, 200C of a redistribution layer section (RDL) 203 in the fan-in region 301 if the housing 114 is embodied as a wafer level package (WLP) (FIG. 2A-2C), or
  d) the excitation coil 111 is configured in the form of a metallization layer 200A, 200B, 200C of a redistribution layer section (RDL) 203, 213 in the fan-out region if the housing is configured as a wafer level ball grid array (WLB) package or as an embedded wafer level ball grid array (eWLB) package, or
  e) the excitation coil 111 is configured in the form of a metallization layer 200 arranged on an outer contour surface 114a of a potting compound forming the housing 114, or
  f) the excitation coil 111 is configured in the form of a metallization layer 200 arranged on a printed circuit board surface 801a, 801b of a printed circuit board 801 forming the housing 114.

Figure 9:
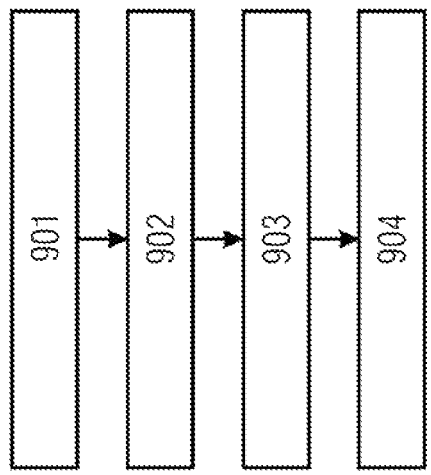
FIG. 9 shows a schematic block diagram for illustrating a method for producing a housed inductive angle and/or position sensor, in accordance with one conceivable example implementation.

FIG. 9 shows a schematic block diagram for illustrating a method for producing a housed inductive angle and/or position sensor 100.

In step 901, a first sensor component 110, for example a stator, and a second sensor component 120, for example a rotor, which is movable relative thereto, are provided. The first sensor component 110 can comprise an excitation coil 111 and a receiving coil arrangement 112 having two or more individual receiving coils 112A, 112B, and the second sensor component 120 can comprise an inductive target 121.

Furthermore, the excitation coil 111 can be able to be excited with an AC current $I_1$ in order to induce an induced current in the inductive target 121, and the inductive target 121 can be configured to generate a magnetic field in reaction to the induced current, the magnetic field in turn generating an induction signal $S_1$ in the receiving coil arrangement 112.

In step 902, a semiconductor chip 113 is arranged in, at or on the first sensor component 110, wherein the semiconductor chip 113 comprises an integrated circuit configured to determine a relative position of the second sensor component 120 relative to the first sensor component 110 on the basis of the induction signal $S_1$.

In step 903, a housing 114 is provided and the semiconductor chip 113 is arranged within the housing 114.

In step 904, the individual receiving coils 112A, 112B of the receiving coil arrangement 112 are produced, specifically by structuring at least two metallization layers 201, 202 which are spaced apart from one another and which are arranged within the housing 114 or outside on an outer surface 114a, 114b of the housing 114.

The example implementations described above merely present an illustration of the principles of the concept described herein. It goes without saying that modifications and variations of the arrangements and details described herein will be apparent to others skilled in the art. Therefore, the intention is for the concept described herein to be restricted only by the scope of protection of the following patent claims, and not by the specific details that have been presented herein on the basis of the description and the explanation of the example implementations.

Although some aspects have been described in association with a device, it goes without saying that these aspects also represent a description of the corresponding method, such that a block or a component of a device should also be understood as a corresponding method step or as a feature of a method step. Analogously to this, aspects that have been described in association with or as a method step also represent a description of a corresponding block or detail or feature of a corresponding device.

The invention claimed is:

1. An inductive angle and/or position sensor, comprising:
    a first sensor component and a second sensor component, which is movable relative thereto,
        wherein the first sensor component comprises an excitation coil and a receiving coil arrangement having two or more individual receiving coils,
        wherein the second sensor component comprises an inductive target,
        wherein the excitation coil is configured to be excited with an AC current to induce an induced current in the inductive target,
        wherein the inductive target is configured to generate a magnetic field in reaction to the induced current, the magnetic field in turn generating an induction signal in the receiving coil arrangement,
        wherein the first sensor component comprises a semiconductor chip having an integrated circuit configured to determine a position of the second sensor component relative to the first sensor component based on the induction signal, and
        wherein the semiconductor chip comprises a multiplicity of integrated chip metallization layers arranged in different planes; and
    a housing, in which the semiconductor chip is arranged,
        wherein the individual receiving coils of the receiving coil arrangement are configured in at least two structured metallization layers spaced apart from one another, which are arranged within the housing and/or outside on an outer surface of the housing, and
        wherein at least one of the at least two structured metallization layers spaced apart from one another, in which the receiving coils are configured, is arranged in a form of at least one of the multiplicity of integrated chip metallization layers.

2. The inductive angle and/or position sensor as claimed in claim 1,
    wherein the semiconductor chip comprises a first chip surface and an opposite second chip surface,
    wherein contact sections for electrically contacting the semiconductor chip are arranged on the first chip surface, and
    wherein at least one of the at least two structured metallization layers spaced apart from one another, in which the receiving coils are configured, is arranged within the housing and on the opposite second chip surface.

3. The inductive angle and/or position sensor as claimed in claim 2,
    wherein at least one of the two structured metallization layers spaced apart from one another, in which the receiving coils are configured, is galvanically connected to at least one of the contact sections on the first chip surface using a chip via extending through the semiconductor chip between the first chip surface and the opposite second chip surface.

4. The inductive angle and/or position sensor as claimed in claim 2,
    wherein at least one of the at least two structured metallization layers spaced apart from one another, in which the receiving coils are configured, is galvanically connected to at least one of the contact sections on the first chip surface using an electrically conductive structure running laterally at a lateral chip outer contour.

5. The inductive angle and/or position sensor as claimed in claim 1,
    wherein the housing is embodied as a wafer level (WLP) package,
    wherein the WLP package comprises a redistribution layer section having a plurality of metallization layers spaced apart from one another in a fan-in region, and
    wherein at least one of the at least two structured metallization layers spaced apart from one another, in which the receiving coils are configured, is configured within the housing and in a form of one of the metallization layers of the redistribution layer section in the fan-in region.

6. The inductive angle and/or position sensor as claimed in claim 1,
    wherein the housing is embodied as a wafer level ball grid array (WLB) package or as an embedded wafer level ball grid array (eWLB) package,
    wherein the package comprises a redistribution layer section having a plurality of metallization layers spaced apart from one another in a fan-out region, and
    wherein at least one of the at least two structured metallization layers spaced apart from one another, in which the receiving coils are configured, is configured within the housing and in a form of one of the metallization layers of the redistribution layer section in the fan-out region.

7. The inductive angle and/or position sensor as claimed in claim 1,
    wherein the housing is embodied as a wafer level ball grid array (WLB) package or as an embedded wafer level ball grid array (eWLB) package,
    wherein a redistribution layer section having a plurality of structured metallization layers spaced apart from one another is arranged on a housing surface of the housing, and wherein at least one of the at least two structured metallization layers spaced apart from one another, in which the receiving coils are configured, is configured outside the housing and in a form of one of the structured metallization layers of the redistribution layer section on the housing surface in a fan-out region and/or in a fan-in region.

8. The inductive angle and/or position sensor as claimed in claim 7,
wherein electrical contact sections are provided on a side of the package situated opposite the housing surface, and
wherein at least one of the two structured metallization layers spaced apart from one another, in which the receiving coils are configured, is galvanically connected to at least one of the electrical contact sections using a vertical via extending through the package between the housing surface and an opposite side.

9. The inductive angle and/or position sensor as claimed in claim 1,
wherein the semiconductor chip is arranged on a substrate and is potted with a potting compound, wherein the substrate and the potting compound form the housing,
wherein a metallization having one or more other structured metallization layers is arranged on an outer contour surface of the housing situated opposite the substrate, and
wherein at least one of the at least two structured metallization layers spaced apart from one another, in which the receiving coils are configured, is configured outside the housing and in a form of one of the metallization layers of the metallization arranged on the outer contour surface.

10. The inductive angle and/or position sensor as claimed in claim 9,
wherein the housing comprises a lateral outer contour surface between the substrate and the outer contour surface situated opposite the substrate,
wherein an electrically conductive structure is arranged on the lateral outer contour surface, and
wherein at least one of the at least two structured metallization layers spaced apart from one another, in which the receiving coils are configured, is galvanically connected to the substrate using the electrically conductive structure.

11. The inductive angle and/or position sensor as claimed in claim 1,
wherein the semiconductor chip is integrated in a printed circuit board forming the housing,
wherein a printed circuit board metallization having one or more other structured metallization layers spaced apart from one another is arranged on a printed circuit board surface, and
wherein at least one of the at least two structured metallization layers spaced apart from one another, in which the receiving coils are configured, is configured outside the housing and in a form of at least one of the metallization layers of the printed circuit board metallization.

12. The inductive angle and/or position sensor as claimed in claim 1,
wherein the housing is embodied with no printed circuit board.

13. The inductive angle and/or position sensor as claimed in claim 1,
wherein the excitation coil is arranged within the housing or outside on an outer surface of the housing and is configured in another structured metallization layer by virtue of at least one of:
a) the excitation coil is configured in the form of a metallization layer integrated in the semiconductor chip,
b) the excitation coil is configured in the form of a metallization layer arranged on a second chip surface of the semiconductor chip situated opposite a first chip surface comprising electrical contact sections,
c) the excitation coil is embodied in a form of a metallization layer of a redistribution layer section in a fan-in region if the housing forms a wafer level package,
d) the excitation coil is configured in the form of a metallization layer of a redistribution layer section in a fan-out region if the housing is configured as a wafer level ball grid array (WLB) package or as an embedded wafer level ball grid array (eWLB) package,
e) the excitation coil is configured in the form of a metallization layer arranged on an outer contour surface of a potting compound forming the housing, or
f) the excitation coil is configured in the form of a metallization layer arranged on a printed circuit board surface of a printed circuit board forming the housing.

14. A method for producing a housed inductive angle and/or position sensor, wherein the method comprises the following steps:
providing a first sensor component and a second sensor component, which is movable relative thereto,
wherein the first sensor component comprises an excitation coil and a receiving coil arrangement having two or more individual receiving coils, and wherein the second sensor component comprises an inductive target,
wherein the excitation coil is configured to be excited with an AC current to induce an induced current in the inductive target,
wherein the inductive target is configured to generate a magnetic field in reaction to the induced current, the magnetic field in turn generating an induction signal in the receiving coil arrangement,
arranging a semiconductor chip on the first sensor component,
wherein the semiconductor chip comprises an integrated circuit configured to determine a relative position of the second sensor component relative to the first sensor component based on the induction signal, and
wherein the semiconductor chip comprises a multiplicity of integrated chip metallization layers arranged in different planes; and
providing a housing and arranging the semiconductor chip within the housing; and
producing the individual receiving coils of the receiving coil arrangement by structuring at least two metallization layers spaced apart from one another, which are arranged in a form of at least one of the multiplicity of integrated chip metallization layers and arranged within the housing or outside on an outer surface of the housing.

15. The method for producing a housed inductive angle and/or position sensor as claimed in claim 14,
- wherein the semiconductor chip comprises a first chip surface and an opposite second chip surface,
- wherein contact sections for electrically contacting the semiconductor chip are arranged on the first chip surface, and
- wherein at least one of the at least two structured metallization layers spaced apart from one another, in which the receiving coils are configured, is arranged within the housing and on the opposite second chip surface.

16. The method for producing a housed inductive angle and/or position sensor as claimed in claim 14,
- wherein the semiconductor chip is arranged on a substrate and is potted with a potting compound, wherein the substrate and the potting compound form the housing,
- wherein a metallization having one or more other structured metallization layers is arranged on an outer contour surface of the housing situated opposite the substrate, and
- wherein at least one of the at least two structured metallization layers spaced apart from one another, in which the receiving coils are configured, is configured outside the housing and in a form of one of the metallization layers of the metallization arranged on the outer contour surface.

17. The method for producing a housed inductive angle and/or position sensor as claimed in claim 14,
- wherein the semiconductor chip is integrated in a printed circuit board forming the housing,
- wherein a printed circuit board metallization having one or more other structured metallization layers spaced apart from one another is arranged on a printed circuit board surface, and
- wherein at least one of the at least two structured metallization layers spaced apart from one another, in which the receiving coils are configured, is configured outside the housing and in a form of at least one of the metallization layers of the printed circuit board metallization.

18. The method for producing a housed inductive angle and/or position sensor as claimed in claim 14,
- wherein the housing is embodied with no printed circuit board.

19. The method for producing a housed inductive angle and/or position sensor as claimed in claim 14,
- wherein the housing is embodied as a wafer level (WLP) package, a wafer level ball grid array (WLB) package, or as an embedded wafer level ball grid array (eWLB) package.

* * * * *